(12) United States Patent
Hosoya

(10) Patent No.: US 9,411,160 B2
(45) Date of Patent: Aug. 9, 2016

(54) HEAD MOUNTED DISPLAY, CONTROL METHOD FOR HEAD MOUNTED DISPLAY, AND IMAGE DISPLAY SYSTEM

(71) Applicant: SEIKO EPSON CORPORATION, Tokyo (JP)

(72) Inventor: Yoshinori Hosoya, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 87 days.

(21) Appl. No.: 14/162,043

(22) Filed: Jan. 23, 2014

(65) Prior Publication Data

US 2014/0225812 A1    Aug. 14, 2014

(30) Foreign Application Priority Data

Feb. 12, 2013  (JP) ................................. 2013-024089
Oct. 30, 2013  (JP) ................................. 2013-225388

(51) Int. Cl.
| | | |
|---|---|---|
| *G09G 5/00* | (2006.01) | |
| *G02B 27/00* | (2006.01) | |
| *G02B 27/01* | (2006.01) | |
| *G06F 3/01* | (2006.01) | |
| *G06F 3/0481* | (2013.01) | |

(52) U.S. Cl.
CPC .......... *G02B 27/0093* (2013.01); *G02B 27/017* (2013.01); *G06F 3/013* (2013.01); *G06F 3/04815* (2013.01); *G02B 2027/014* (2013.01); *G02B 2027/0138* (2013.01)

(58) Field of Classification Search
CPC ....... G02B 27/01; G02B 27/0172; G09G 5/00
USPC .............................................. 345/8, 419, 156
See application file for complete search history.

(56) References Cited

U.S. PATENT DOCUMENTS

| | | | |
|---|---|---|---|
| 2009/0278766 A1* | 11/2009 | Sako et al. ......................... 345/8 |
| 2011/0128350 A1* | 6/2011 | Oliver et al. ..................... 348/36 |
| 2012/0206452 A1* | 8/2012 | Geisner et al. ................. 345/419 |
| 2012/0293396 A1* | 11/2012 | Sako ................... H04N 13/044 345/8 |
| 2012/0293548 A1* | 11/2012 | Perez et al. .................... 345/633 |
| 2013/0083003 A1* | 4/2013 | Perez et al. .................... 345/419 |

FOREIGN PATENT DOCUMENTS

| | | |
|---|---|---|
| JP | A-9-74504 | 3/1997 |
| JP | A-9-74505 | 3/1997 |
| JP | A-9-74512 | 3/1997 |
| JP | A-2003-274257 | 9/2003 |

* cited by examiner

*Primary Examiner* — Grant Sitta
(74) *Attorney, Agent, or Firm* — Oliff PLC

(57) ABSTRACT

A transmission type head mounted display includes an image display unit that forms an image on the basis of image data and allows the formed image to be visually recognized by a user as a virtual image in a state in which the image display unit is mounted on the head of the user, a position specifying unit that specifies a target position which is a position of a specific target object relative to the image display unit; and a control unit that causes the image display unit to form a target position display image indicating the target position and that sets a position of the target position display image in an image formation region which is a region where the image display unit forms an image, on the basis of the target position specified by the position specifying unit.

14 Claims, 21 Drawing Sheets

HEAD MOUNTED DISPLAY, CONTROL METHOD FOR HEAD MOUNTED DISPLAY, AND IMAGE DISPLAY SYSTEM

BACKGROUND

1. Technical Field

The present invention relates to a head mounted display.

2. Related Art

A head mounted display (HMD) which is a display mounted on the head is known. The head mounted display generates image light representing an image by using, for example, a liquid crystal display and a light source, and guides the generated image light to user's eyes by using a projection optical system or a light guiding plate, thereby causing the user to visually recognize a virtual image. Of the head mounted display, there are two types including a transmission type in which a user can visually recognize external scenery in addition to a virtual image and a non-transmission type in which the user cannot visually recognize the external scenery. The transmission type head mounted display includes an optical transmission type display and a video transmission type display.

On the other hand, a video camera which is an automatic tracking type image capturing apparatus is known. The video camera receives a signal transmitted from a transmitter attached to an object, specifies a position of the object on the basis of the received signal, and tracks variations in positions of the object, thereby capturing an image of the object.

JP-A-9-74512 discloses a technique in which a position of an object is specified by receiving infrared rays from an infrared transmitter attached to the object and an image of the object can be captured through automatic tracking by moving a camera fixing tripod. In addition, JP-A-9-74504 discloses a technique in which infrared rays from an infrared transmitter attached to an object are received, a specified position of the object is converted into an image signal, and an image which is generated based on the image signal is displayed on a viewfinder of a video camera in correlation with the position of the object. Further, JP-A-9-74505 discloses an automatic tracking type video camera which can easily specify a position of an object by increasing the number of infrared transmitters attached to the object. Furthermore, JP-A-2003-274257 discloses an automatic tracking type image capturing system which receives a signal transmitted from a transmitter attached to an object, specifies a position of the object and acceleration of the object, and performs zooming control according to the acceleration of the object.

However, in the techniques disclosed in the above patent documents, there is a concern that an object cannot be automatically tracked and thus an image thereof cannot be captured when a movement such as speed or acceleration of the object is great. In addition, a user of a video camera which captures an image of an object is required to check whether or not image capturing is normally performed while looking at a viewfinder or a monitor. Thus, there is room for improvement in the image capturing method in order to normally capture an image of an object while visually recognizing the object. Further, in the video camera, there is a case where external scenery which is visually recognized by the user of the video camera is different from external scenery whose image has been captured. Furthermore, it is desirable to specify a position of an object without capturing an image of the object. Moreover, an apparatus which has an image capturing function and is more convenient to use is desirable.

SUMMARY

An advantage of some aspects of the invention is to solve at least a part of the problems described above, and the invention can be implemented as the following aspects.

(1) An aspect of the invention provides a transmission type head mounted display. The head mounted display includes an image display unit that forms an image on the basis of image data and causes the formed image to be visually recognized by a user as a virtual image in a state in which the image display unit is mounted on the head of the user; a position specifying unit that specifies a target position which is a position of a specific target object relative to the image display unit; and a control unit that causes the image display unit to form a target position display image indicating the specific target position and that sets a position of the target position display image in an image formation region which is a region where the image display unit forms an image, on the basis of the target position specified by the position specifying unit. According to the head mounted display of this aspect, the image indicating a position of the specific target object is visually recognized by the user in the image formation region of the image display unit mounted on the head of the user. For this reason, the user can recognize the position of the specific target object even if the user does not move his/her head, and thus convenience to the user improves. In addition, the user can grasp a direction in which the specific target object is present even if the user cannot directly visually recognize the specific target object due to some covering or the like.

(2) The head mounted display of the aspect of the invention may further include an image capturing unit that captures an image of external scenery in a predetermined range including a visual line direction of the user. According to the head mounted display, an image of substantially same external scenery as external scenery which is visually recognized by the user can be captured, and thus the user is not required to purposely confirm an image of which capturing is in progress. Therefore, the external scenery is easily imaged, and convenience to the user improves.

(3) The head mounted display of the aspect of the invention may further include a judgment unit that judges whether or not the specific target is included in an image capturing direction range which is the predetermined range imaged by the image capturing unit. Here, when the judgment unit judges that the specific target object is included in the image capturing direction range, the control unit may cause the image display unit to form the target position display image and may set a position of the target position display image in the image formation region on the basis of the target position, and when the judgment unit judges that the specific target object is not included in the image capturing direction range, the control unit may cause the image display unit to form the target position display image as a target direction estimation image which is an image indicating a direction from the image display unit to the specific target object and may set a position of the target direction estimation image in the image formation region on the basis of the target position. According to the head mounted display, since a position of an image indicating the specific target object is different in states in which the specific target object is visually recognized and is not visually recognized by the user, the user easily judges whether or not the specific target object is included in the range of an angle of view of the image capturing unit, and convenience to the user improves.

(4) In the head mounted display of the aspect of the invention, the target direction estimation image may include an image indicating the target position. According to the head mounted display, when the user cannot visually recognize the specific target object, a relative position of the specific target object relative to the user can be visually recognized. Thus, the specific target object is easily found, and convenience to the user improves.

(5) In the head mounted display of the aspect of the invention, the control unit may cause the image display unit to form a captured image obtained by the image capturing unit as an image of a region smaller than the image formation region. According to the head mounted display, the user can visually recognize a captured image obtained by the image capturing unit along with the external scenery without being obstructed by the external scenery which can be visually recognized through the image display unit. Therefore, convenience to the user improves.

(6) In the head mounted display of the aspect of the invention, the control unit may set a position of the captured image in the image formation region on the basis of an angle formed between the visual line direction and the direction from the image display unit to the specific target object. According to the head mounted display, since a position of an image indicating the specific target object is different in states in which the specific target object is visually recognized and is not visually recognized by the user, the user easily judges whether or not the specific target object is included in the range of an angle of view of the image capturing unit, and convenience to the user improves.

(7) In the head mounted display of the aspect of the invention, the control unit may set a position of the captured image in the image formation region, in peripheral parts excluding a center of the image formation region. According to the head mounted display, the user more easily visually recognizes the external scenery, and convenience to the user further improves.

(8) In the head mounted display of the aspect of the invention, the control unit may specify a distance between the image display unit and the specific target object on the basis of the target position, and may cause the image display unit to form an image indicating the specified distance. According to the head mounted display, not only a positional relationship between the user and the specific target object is specified, but also a distance between the user and the specific target object is specified. For this reason, the user can select an action such as a movement based on the distance or changing of only a visual line direction, and thus convenience to the user improves.

(9) The head mounted display of the aspect of the invention may further include an image judgment unit that stores a target image which is an image indicating the specific target object and judges whether or not the target image is included in a captured image obtained by the image capturing unit. Here, when it is judged that the target image is included in the captured image, the position specifying unit may specify the target position, and when it is judged that the target image is not included in the captured image, the position specifying unit may not specify the target position. According to the head mounted display, a position of the specific target object can be specified even if a device such as a transmitter is not carried by or attached to the specific target object in advance, and thus convenience to the user improves. In addition, a case can be excluded in which a position of the specific target object is not specified and the specific target object is not reflected in a captured image obtained by the image capturing unit due to a covering or the like even if the specific target object is included in the range of an angle of view of the image capturing unit. Thus, the user can perform image capturing on the specific target object more efficiently.

(10) The head mounted display of the aspect of the invention may further include a judgment unit that judges whether or not the specific target is included in an image capturing direction range which is the predetermined range imaged by the image capturing unit. Here, when the judgment unit judges that the specific target object is included in the image capturing direction range, the control unit may cause the image display unit to form an image in which the predetermined range set based on the target position is enlarged or reduced. According to the head mounted display, even if the specific target object which is an image capturing target does not match a visual line direction of the user, it is possible for the user to capture an image of the object.

(11) The head mounted display of the aspect of the invention may further include a visual line direction specifying unit that specifies a visual line direction of the user. Here, the control unit may cause the image display unit to form an image in which the predetermined range which is set on the basis of the specified visual line direction and whose image is captured by the image capturing unit is enlarged or reduced. According to the head mounted display, a range which is desired to be visually recognized by the user can be enlarged or reduced to be visually recognized by the user, and thus convenience to the user improves.

(12) In the head mounted display of the aspect of the invention, the control unit may cause the image display unit to form an image indicating the predetermined range whose image is captured by the image capturing unit. According to the head mounted display, the predetermined range whose image is captured can be recognized by the user as visual information, and thus convenience to the user improves.

(13) The head mounted display of the aspect of the invention may further include a sound acquisition unit that acquires sounds, and, here, the control unit may control the image capturing unit on the basis of acquired sounds. According to the head mounted display, since the head mounted display is controlled on the basis of the voice of the user, the user can control the head mounted display without using his/her hands. Therefore, convenience to the user improves.

(14) The head mounted display of the aspect of the invention may further include an eye image capturing unit that captures an image of the eyes of the user, and, here, the control unit may control the image capturing unit on the basis of a captured image of an eye state of the user. According to the head mounted display, the user can control the head mounted display without using his/her hands, and the voice of the user is not acquired in combination with external sounds other than the sounds of the user. Therefore, it is possible to acquire appropriate captured image and sounds as requested by the user.

(15) The head mounted display of the aspect of the invention may further include a correction unit that corrects image blurring in an image captured by the image capturing unit. According to the head mounted display, it is possible to provide a clear captured image by correcting blurring of the image caused by unintended shaking of the head of the user.

(16) The head mounted display of the aspect of the invention may further include a motion detection unit that detects a motion of the image display unit and a display unit tilt which is a tilt of the image display unit relative to the gravity direction; and a correction unit that corrects a tilt of an image captured by the image capturing unit, relative to the gravity direction, on the basis of the detected motion of the image display unit and display unit tilt. According to the head mounted display, it is possible to provide a clear captured image by correcting blurring of the image caused by unintended shaking of the head of the user.

All of the plurality of constituent elements in the respective aspects of the invention described above are not essential, and some of the plurality of constituent elements may be changed, deleted, exchanged with other new constituent elements, and partially deleted from limited content thereof, as appropriate, in order to solve some or all of the above-described problems or in order to achieve some or all of the effects described in the present specification. In addition, in order to solve some or all of the above-described problems or in order to achieve some or all of the effects described in the present specification, some or all of the technical features included in one aspect of the invention described above may be combined with some or all of the technical features included in another aspect of the invention described above, and as a result may be treated as an independent aspect of the invention.

For example, one aspect of the invention may be realized as a device which includes one or more or all of the three constituent elements, the image display unit, the position specifying unit, and the control unit. In other words, this device may or may not include the image display unit. Further, the device may or may not include the position specifying unit. Furthermore, the device may or may not include the control unit. The image display unit may form an image on the basis of image data and allow the user to visually recognize the formed image as a virtual image, for example, in a state of being mounted on the head of the user. The position specifying unit may specify, for example, a target position which is a position of a specific target object relative to the image display unit. In addition, the control unit may cause the image display unit to form a target position display image indicating the target position and may set a position of the target position display image in an image formation region which is a region where the image display unit forms an image, on the basis of the target position specified by the position specifying unit. This device may be realized as, for example, a head mounted display, but may be realized as devices other than the head mounted display. According to such an aspect, it is possible to achieve at least one of various objects such as improvement in operability and simplification of a device, integration of devices, improvement in convenience to a user who uses a device, and the like. Some or all of the above-described technical features of each aspect of the head mounted display are applicable to the device.

The invention may be realized in various aspects other than the head mounted display. For example, the invention may be realized in aspects such as a control method for a head mounted display, a head mounted display system, a computer program for realizing functions of a head mounted display system, a recording medium for recording the computer program thereon, and data signals which include the computer program and are embodied in carrier waves.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
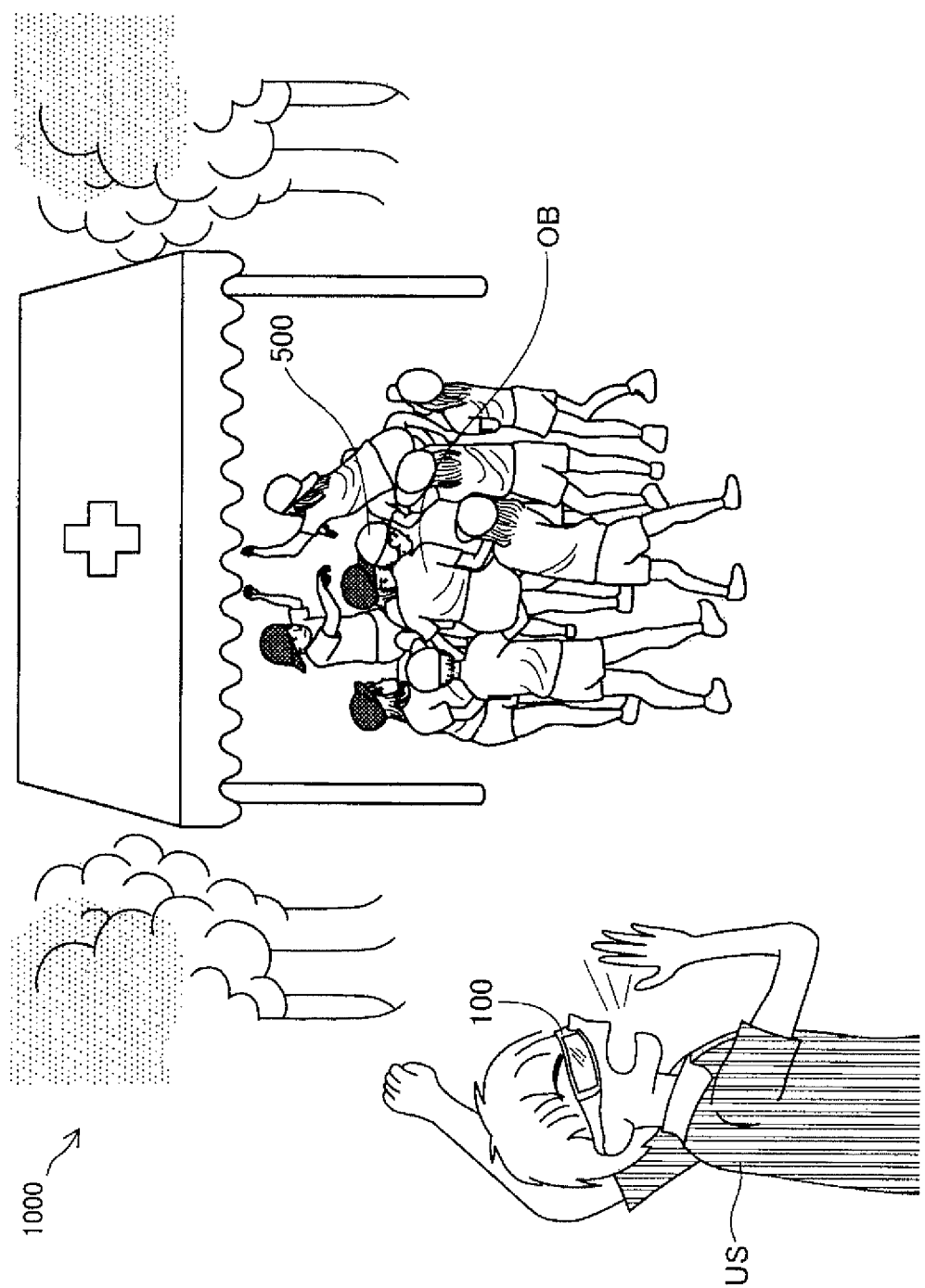
FIG. 1 is a diagram illustrating a schematic configuration of an image capturing system according to an embodiment of the invention.

Next, embodiments of the invention will be described in the following order.
A. Embodiment
A-1. Configuration of image capturing system
A-2. Configuration of head mounted display
A-3. Object position image display process
B. Another embodiment
C. Modification Examples A. Embodiment A-1. Configuration of Image Capturing System FIG. 1 is a diagram illustrating a schematic configuration of an image capturing system 1000 according to an embodiment of the invention. In an image capturing system illustrated in FIG. 1, in an athletic meeting, a user US of a head mounted display 100 (described later in detail) captures an image of an object OB to which an object position specifying device 500 specifying a position of the object OB is attached. The image capturing system 1000 includes the object position specifying device 500 and the head mounted display 100. The object position specifying device 500 is provided in a cap which the object OB wears on the head, has a GPS module built therein, and receives a signal from a GPS satellite, thereby detecting a current position of the object OB. When the current position of the object OB is detected, the user US of the head mounted display 100 can specify the current position of the object OB through wireless communication. In addition, the image capturing system 1000 corresponds to an image display system in the appended claims, and the object position specifying device 500 corresponds to a target position information transmission device. Further, the object OB corresponds to a specific target object in the appended claims.

A-2. Configuration of Head Mounted Display

Figure 2:
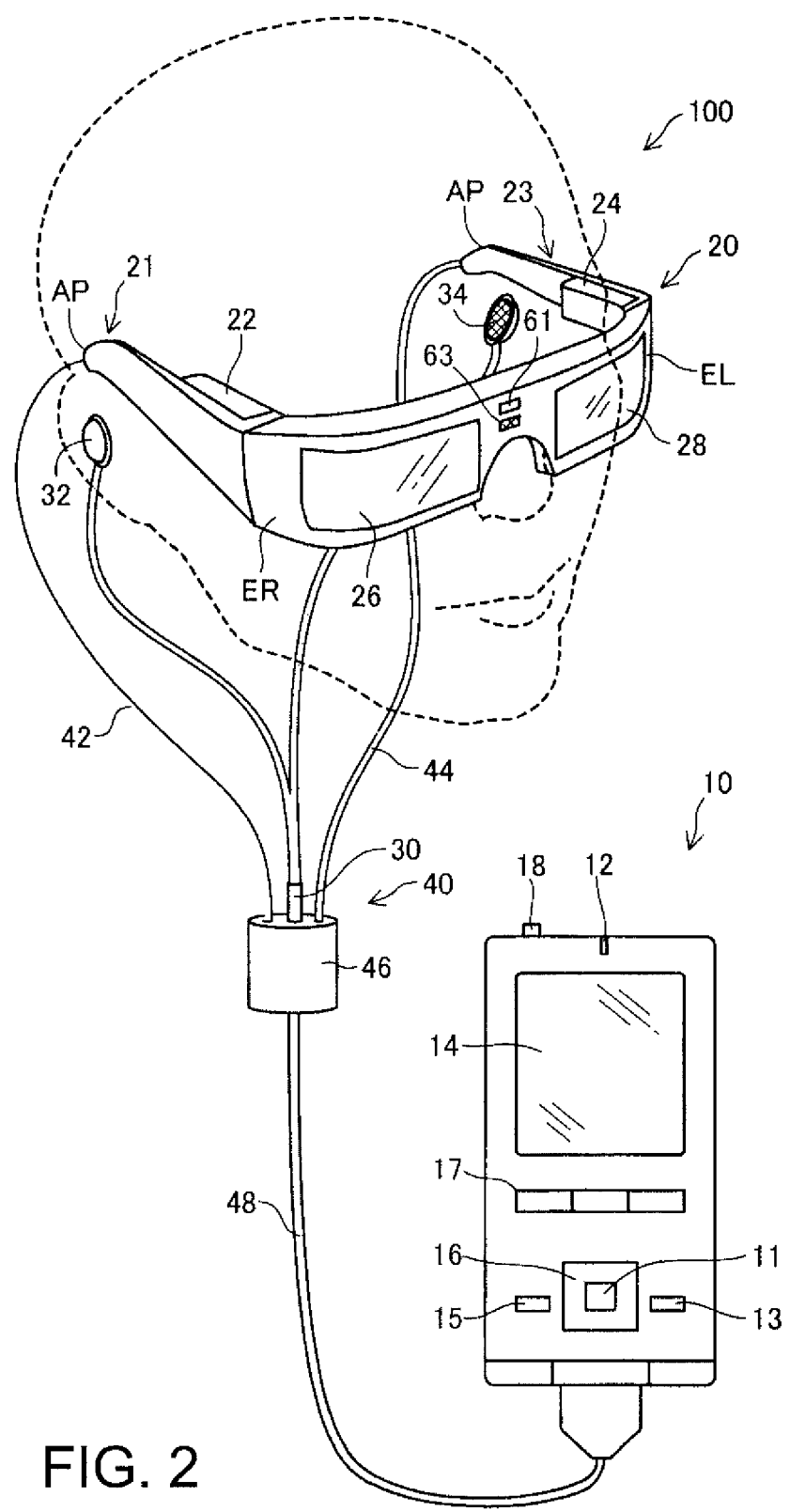
FIG. 2 is a diagram illustrating an exterior configuration of a head mounted display.

FIG. 2 is a diagram illustrating an exterior configuration of the head mounted display 100. The head mounted display 100 is a display mounted on the head and is also referred to as Head Mounted Display (HMD). The head mounted display 100 according to the present embodiment is an optical transmission type head mounted display which allows the user US to visually recognize a virtual image and also to directly visually recognize external scenery. In addition, in the present specification, for convenience, a virtual image which the head mounted display 100 allows the user US to visually recognize is also referred to as a "display image". Further, emitting image light which is generated on the basis of image data is also referred to as "displaying an image".

The head mounted display 100 includes an image display section 20 which allows the user US to visually recognize a virtual image in a state of being mounted on the head of the user, and a control section 10 (a controller 10) which controls the image display section 20.

The image display section 20 is a mounting body which is mounted on the head of the user US, and has a glasses shape in the present embodiment. The image display section 20 includes a right holding unit 21, a right display driving unit 22, a left holding unit 23, a left display driving unit 24, a right optical image display unit 26, a left optical image display unit 28, a camera 61, and a microphone 63. The right optical image display unit 26 and the left optical image display unit 28 are disposed so as to be located in front of the left and right eyes of the user US when the user US wears the image display section 20. One end of the right optical image display unit 26 and one end of the left optical image display unit 28 are connected to each other at the position corresponding to the glabella of the user US when the user US wears the image display section 20.

The right holding unit 21 is a member which is provided so as to extend over a position corresponding to the temporal region of the user US when the user US wears the image display section 20, from an end part ER which is the other end of the right optical image display unit 26. Similarly, the left holding unit 23 is a member which is provided so as to extend over a position corresponding to the temporal region of the user US when the user US wears the image display section 20, from an end part EL which is the other end of the left optical image display unit 28. The right holding unit 21 and the left holding unit 23 hold the image display section 20 on the head of the user US in the same manner as temples of glasses.

The right display driving unit 22 and the left display driving unit 24 are disposed at locations opposing the head of the user US when the user US wears the image display section 20. In addition, hereinafter, the right holding unit 21 and the left holding unit 23 are also collectively referred to as "holding units", the right display driving unit 22 and the left display driving unit 24 are also collectively referred to as "display driving units", and the right optical image display unit 26 and the left optical image display unit 28 are also collectively referred to as "optical image display units".

Figure 3:
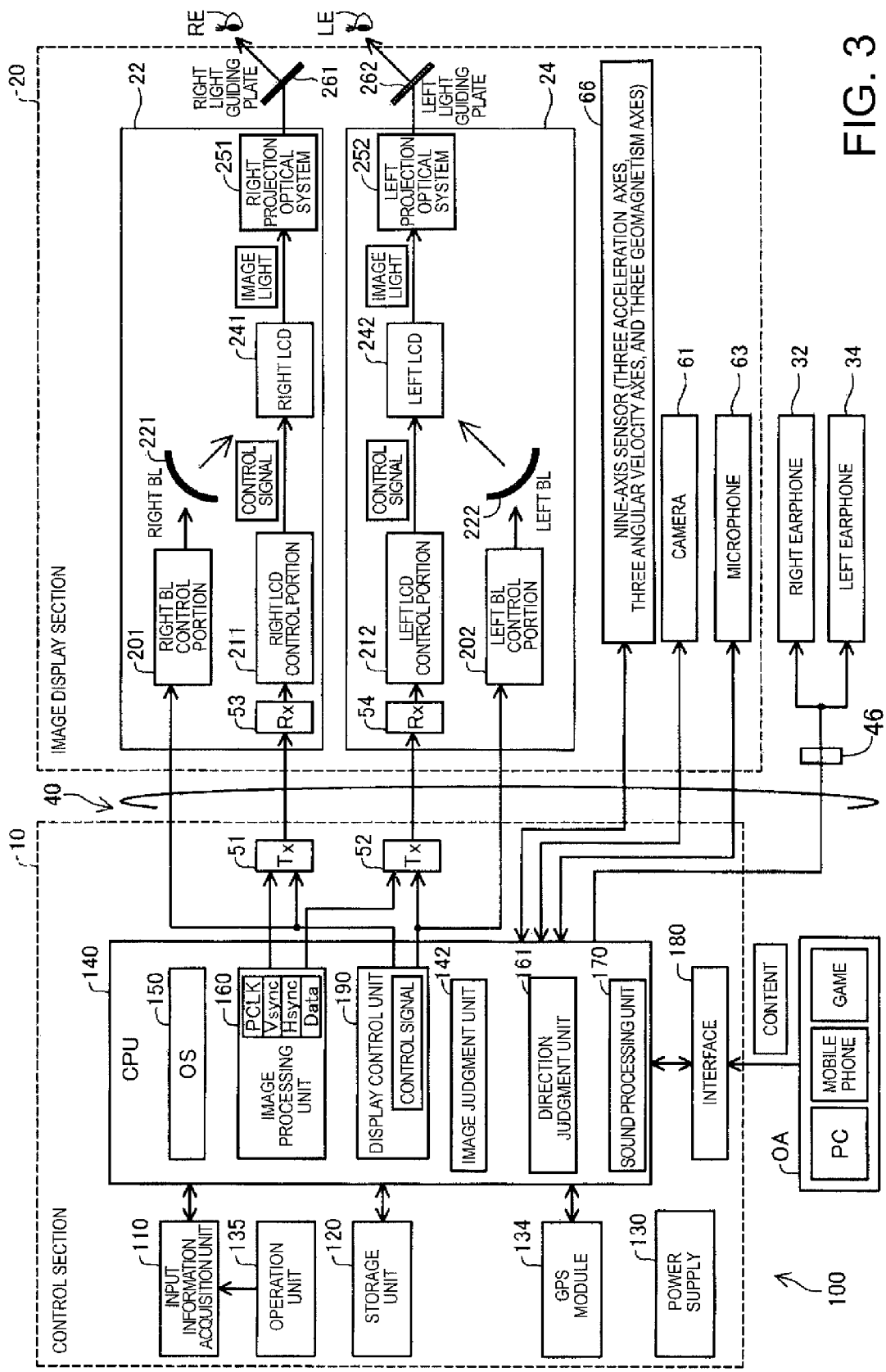
FIG. 3 is a functional block diagram illustrating a configuration of the head mounted display.

The display driving units 22 and 24 include liquid crystal displays 241 and 242 (also referred to as LCDs 241 and 242), projection optical systems 251 and 252, and the like (refer to FIG. 3). Details of configurations of the display driving units 22 and 24 will be described. The optical image display units 26 and 28 as optical members include light guiding plates 261 and 262 (refer to FIG. 3) and dimming plates. The light guiding plates 261 and 262 are made of a light-transmitting resin material or the like, and guide image light output from the display driving units 22 and 24 to the eyes of the user US. The dimming plates are thin plate-shaped optical elements, and are disposed so as to cover a surface side of the image display section 20 opposite the eye sides of the user US. The dimming plates protect the light guiding plates 261 and 262 so as to prevent the light guiding plates 261 and 262 from being damaged, polluted, or the like. In addition, light transmittance of the dimming plates is adjusted so as to adjust an amount of external light entering the eyes of the user US, thereby controlling an extent of visually recognizing a virtual image. Further, the dimming plates may be omitted.

The camera 61 is disposed at the position corresponding to the glabella of the user US when the user US wears the image display section 20. The camera 61 captures an image of external scenery which is an external view in a direction opposite the eye side of the user US, thereby obtaining an external scenery image. The camera 61 in the present embodiment is a monocular camera, but may be a stereo camera. An angle of view of the camera 61 used in the present embodiment is 40 degrees both up and down, and is 60 degrees to both the left and the right, with respect to the same direction as a visual line direction of the user US of the head mounted display 100 described later. The camera 61 corresponds to an image capturing unit in the appended claims. The microphone 63 is a device which acquires sounds, and is disposed at the position corresponding to the glabella of the user US when the user US wears the image display section 20 and at a position under the camera 61. In addition, external scenery whose image is continuously captured by the camera 61 corresponds to a predetermined range of external scenery whose image is captured by the image capturing unit in the appended claims. The user can visually recognize external scenery which is transmitted through the light guiding plates 261 and 262 of the image display section 20 and a display image which is displayed in a maximal image display region PN, separately from external scenery whose image is captured by the camera 61.

The image display section 20 further includes a connection unit 40 which connects the image display section 20 to the control section 10. The connection unit 40 includes a main body cord 48 connected to the control section 10, a right cord 42, a left cord 44, and a connection member 46. The right cord 42 and the left cord 44 are two cords into which the main body cord 48 branches out. The right cord 42 is inserted into a casing of the right holding unit 21 from an apex AP in the extending direction of the right holding unit 21, and is connected to the right display driving unit 22. Similarly, the left cord 44 is inserted into a casing of the left holding unit 23 from the apex AP in the extending direction of the left holding unit 23, and is connected to the left display driving unit 24. The connection member 46 is provided at a branch point of the main body cord 48, the right cord 42, and the left cord 44, and has a jack for connection of an earphone plug 30. A right earphone 32 and a left earphone 34 extend from the earphone plug 30.

The image display section 20 and the control section 10 transmit various signals via the connection unit 40. An end part of the main body cord 48 on a side opposite the connection member 46, and the control section 10 are respectively provided with connectors (not illustrated) fitted into each other. The connector of the main body cord 48 and the connector of the control section 10 are fitted into or released from each other, and thus the control section 10 is connected to or disconnected from the image display section 20. For example, a metal cable or an optical fiber may be used as the right cord 42, the left cord 44, and the main body cord 48.

The control section 10 is a device used to control the head mounted display 100. The control section 10 includes a determination key 11, a lighting unit 12, a display changing key 13, a track pad 14, a luminance changing key 15, a direction key 16, a menu key 17, and a power switch 18. The determination key 11 detects a pushing operation, so as to output a signal for determining content operated in the control section 10. The lighting unit 12 indicates an operation state of the head mounted display 100 by using a light emitting state thereof. The operation state of the head mounted display 100 includes, for example, ON and OFF of power, or the like. For example, a light emitting diode (LED) is used as the lighting unit 12. The display changing key 13 detects a pushing operation so as to output, for example, a signal for changing a content moving image display mode between 3D and 2D. The track pad 14 detects an operation of the finger of the user US on an operation surface of the track pad 14 so as to output a signal based on detected content. Various track pads of a capacitance type, a pressure detection type, and an optical type may be employed as the track pad 14. The luminance changing key 15 detects a pushing operation so as to output a signal for increasing or decreasing a luminance of the image display section 20. The direction key 16 detects a pushing operation on keys corresponding to vertical and horizontal directions so as to output a signal based on detected content. The power switch 18 detects a sliding operation of the switch so as to change a power supply state of the head mounted display 100.

FIG. 3 is a functional block diagram illustrating a configuration of the head mounted display 100. As illustrated in FIG. 3, the control section 10 includes an input information acquisition unit 110, a storage unit 120, a power supply 130, a wireless communication unit 132, a GPS module 134, an operation unit 135, a CPU 140, an interface 180, a transmission unit 51 (Tx 51), and a transmission unit 52 (Tx 52). The operation unit 135 receives an operation from the user US, and is constituted by the determination key 11, the display changing key 13, the track pad 14, the luminance changing key 15, the direction key 16, the menu key 17, and the power switch 18.

The input information acquisition unit 110 acquires a signal based on an operation input by the user US. The signal based on an operation input includes, for example, a signal based on an operation input for the track pad 14, the direction key 16, or the power switch 18. The power supply 130 supplies power to the respective units of the head mounted display 100. For example, a secondary battery may be used as the power supply 130. The wireless communication unit 132 receives position information indicating a current position of, for example, the object position specifying device 500 and performs transmission and reception of a variety of information with other apparatuses in accordance with a predetermined wireless communication standard such as a wireless LAN or Bluetooth. The GPS module 134 detects its own current position by receiving a signal from a GPS satellite. When the current position of the GPS module 134 is detected, a current position of the user US of the head mounted display 100 is specified. The storage unit 120 stores various computer programs. The storage unit 120 is constituted by a ROM, a RAM, and the like. The CPU 140 reads and executes the computer programs stored in the storage unit 120 so as to function as an operating system 150 (OS 150), an image processing unit 160, a display control unit 190, a sound processing unit 170, a direction judgment unit 161, and an image judgment unit 142.

The image processing unit 160 acquires an image signal included in content. The image processing unit 160 separates synchronization signals such as a vertical synchronization signal VSync and a horizontal synchronization signal HSync from the acquired image signal. In addition, the image processing unit 160 generates a clock signal PCLK by using a phase locked loop (PLL) circuit or the like (not illustrated) on the basis of a cycle of the separated vertical synchronization signal VSync or horizontal synchronization signal HSync. The image processing unit 160 converts an analog image signal from which the synchronization signals are separated into a digital image signal by using an A/D conversion circuit or the like (not illustrated). Next, the image processing unit 160 stores the converted digital image signal in a DRAM of the storage unit 120 for each frame as image data Data (RGB data) of a target image. Further, the image processing unit 160 may perform, on the image data, image processes including a resolution conversion process, various color tone correction processes such as adjustment of luminance and color saturation, a keystone correction process, and the like, as necessary.

The image processing unit 160 transmits each of the generated clock signal PCLK, vertical synchronization signal VSync and horizontal synchronization signal HSync, and the image data Data stored in the DRAM of the storage unit 120, via the transmission units 51 and 52. Here, the image data Data which is transmitted via the transmission unit 51 is referred to as "right eye image data", and the image data Data which is transmitted via the transmission unit 52 is referred to as "left eye image data". The transmission units 51 and 52 function as a transceiver for serial transmission between the control section 10 and the image display section 20.

The display control unit 190 generates control signals for control of the right display driving unit 22 and the left display driving unit 24. Specifically, by using the control signals, the display control unit 190 individually controls a right LCD control portion 211 to turn on and off driving of a right LCD 241, a right backlight control portion 201 to turn on and off driving of a right backlight 221, a left LCD control portion 212 to turn on and off driving of a left LCD 242, and a left backlight control portion 202 to turn on and off driving of a left backlight 222. Accordingly, the display control unit 190 controls each of the right display driving unit 22 and the left display driving unit 24 to generate and emit image light. For example, the display control unit 190 causes both of the right display driving unit 22 and the left display driving unit 24 to generate image light, causes either thereof to generate image light, or causes neither thereof to generate image light.

The display control unit 190 transmits control signals for the right LCD control portion 211 and the left LCD control portion 212 thereto via the transmission units 51 and 52, respectively. In addition, the display control unit 190 transmits control signals for the right backlight control portion 201 and the left backlight control portion 202, respectively.

The direction judgment unit 161 judges whether or not an angle is equal to or more than a prescribed threshold value. The angle is formed by a visual line direction of the user US which is estimated from a direction of the image display section 20 detected by a nine-axis sensor 66 described later, and an object direction which is a direction from the image display section 20 to the object OB. The direction judgment unit 161 judges which one of the following three states happens on the basis of an angle formed between the visual line direction and the object direction.

(1) A state in which the object OB is included in a range of an angle of view of the camera 61

(2) A state in which the object OB is not included in a range of an angle of view of the camera 61, and is included in a visual field VR of the user US (3) A state in which the object OB is not included in a visual field VR of the user US In addition, a viewing angle of the user US is preliminarily set to 100 degrees to both the left and the right, 50 degrees upward, and 75 degrees downward, and is wider than an angle of view of the camera 61. If an angle formed by a visual line direction of the user US and an object direction exceeds a range of a viewing field of the user US, the direction judgment unit 161 judges that the object OB is not included in the visual field VR of the user US.

The image judgment unit 142 judges whether or not an image of the object OS which is the same as a specific image indicated by image data stored in the storage unit 120 in advance is included in an external scenery image captured by the camera 61. The sound processing unit 170 acquires an audio signal included in the content so as to amplify the acquired audio signal, and supplies the amplified audio signal to a speaker (not illustrated) of the right earphone 32 connected to the connection member 46 and a speaker (not illustrated) of the left earphone 34 connected thereto. In addition, for example, in a case where a Dolby (registered trademark) system is employed, the audio signal is processed, and thus different sounds of which frequencies are changed are respectively output from the right earphone 32 and the left earphone 34. Further, the sound processing unit 170 converts sounds acquired by the microphone 63 into audio signals, and the storage unit 120 stores the converted audio signals.

The interface 180 is an interface which connects various external apparatuses OA which are content supply sources to the control section 10. The external apparatuses OA include, for example, a personal computer (PC), a mobile phone terminal, a gaming terminal, and the like. For example, a USB interface, a micro-USB interface, a memory card interface, and the like may be used as the interface 180.

The image display section 20 includes the right display driving unit 22, the left display driving unit 24, the right light guiding plate 261 as the right optical image display unit 26, the left light guiding plate 262 as the left optical image display unit 28, the camera 61, the nine-axis sensor 66, and the microphone 63.

The nine-axis sensor 66 is a motion sensor which detects acceleration (in three axes), angular velocity (in three axes), and geomagnetism (in three axes). The nine-axis sensor 66 is provided in the image display section 20, and thus detects a motion of the head of the user US when the image display section 20 is mounted on the head of the user US. Since a direction of the image display section 20 can be recognized from the detected motion of the head of the user US, the direction judgment unit 161 can estimate a visual line direction of the user US.

The right display driving unit 22 includes a reception portion 53 (Rx 53), the right backlight control portion 201 (right BL control portion 201) and the right backlight 221 (right EL 221) which function as a light source, the right LCD control portion 211 and the right LCD 241 which function as a display element, and a right projection optical system 251. The right backlight control portion 201 and the right backlight 221 function as light sources. The right LCD control portion 211 and the right LCD 241 function as a display element. In addition, the right backlight control portion 201, the right LCD control portion 211, the right backlight 221, and the right LCD 241 are collectively referred to as an "image light generation portion".

The reception portion 53 functions as a receiver for serial transmission between the control section 10 and the image display section 20. The right backlight control portion 201 drives the right backlight 221 on the basis of an input control signal. The right backlight 221 is a light emitting body such as, for example, an LED or an electroluminescent element (EL). The right LCD control portion 211 drives the right LCD 241 on the basis of the clock signal PCLK, the vertical synchronization signal VSync, the horizontal synchronization signal HSync, and the right eye image data which are input via the reception portion 53. The right LCD 241 is a transmissive liquid crystal panel in which a plurality of pixels are disposed in a matrix.

The right projection optical system 251 is constituted by a collimator lens which converts image light emitted from the right LCD 241 into parallel beams of light flux. The right light guiding plate 261 as the right optical image display unit 26 reflects image light output from the right projection optical system 251 along a predetermined light path, so as to guide the image light to the right eye RE of the user US. In addition, the right projection optical system 251 and the right light guiding plate 261 are collectively referred to as a "light guiding portion".

The left display driving unit 24 has the same configuration as the right display driving unit 22. The left display driving unit 24 includes a reception portion 54 (Rx 54), the left backlight control portion 202 (left EL control portion 202) and the left backlight 222 (left EL 222) which function as a light source, the left LCD control portion 212 and the left LCD 242 which function as a display element, and a left projection optical system 252. The left backlight control portion 202 and the left backlight 222 function as a light source. The left LCD control portion 212 and the left LCD 242 function as a display element. In addition, the left backlight control portion 202, the left LCD control portion 212, the left backlight 222, and the left LCD 242 are collectively referred to as an "image light generation portion". Further, the left projection optical system 252 is constituted by a collimator lens which converts image light emitted from the left LCD 242 into parallel beams of light flux. The left light guiding plate 262 as the left optical image display unit 28 reflects image light output from the left projection optical system 252 along a predetermined light path, so as to guide the image light to the left eye LE of the user US. Furthermore, the left projection optical system 252 and the left light guiding plate 262 are collectively referred to as a "light guiding portion".

Figure 4:
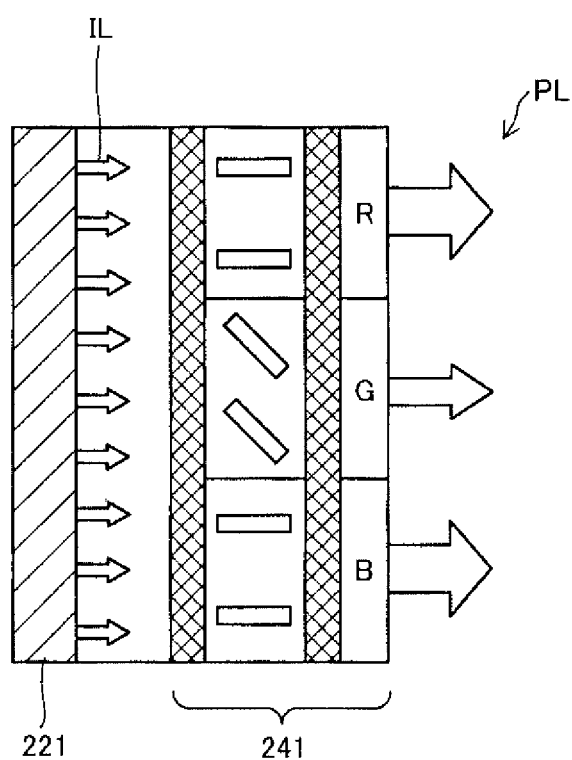
FIG. 4 is a diagram illustrating a state in which image light is generated by an image light generation portion.

FIG. 4 is a diagram illustrating a state in which image light is emitted by the image light generation portion. The right LCD 241 drives liquid crystals at respective pixel positions disposed in a matrix so as to change a transmittance of light transmitted through the right LCD 241, thereby modulating illumination light IL applied from the right backlight 221 into effective image light PL representing an image. This is also the same for the left side. In addition, as in FIG. 4, the backlight type is employed in the present embodiment, but there may be a configuration in which image light is emitted using a front light type or a reflective type.

A-3. Object Position Image Display Process

Figure 5:
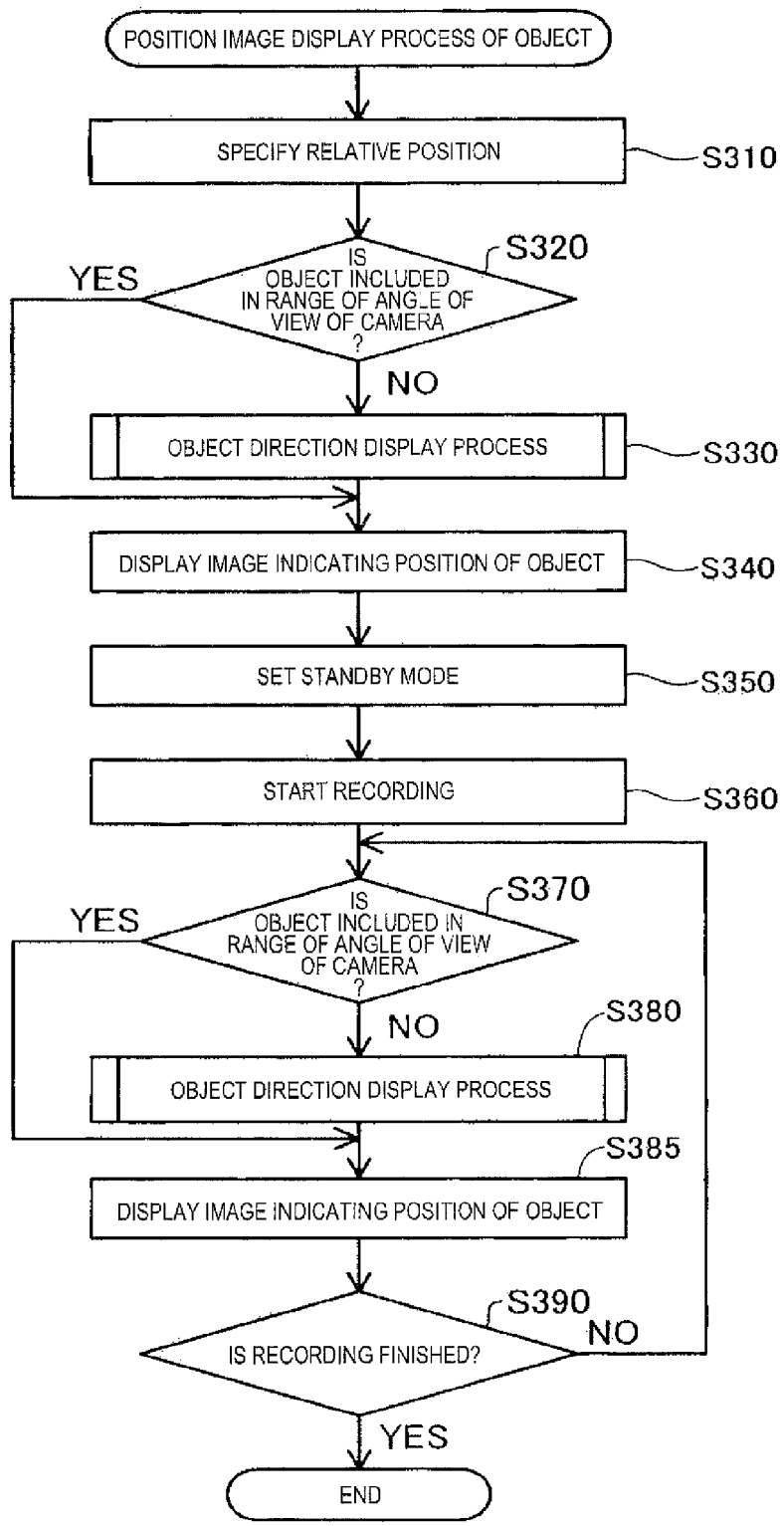
FIG. 5 is a flowchart illustrating a flow of a position image display process of an object.
Figure 6:
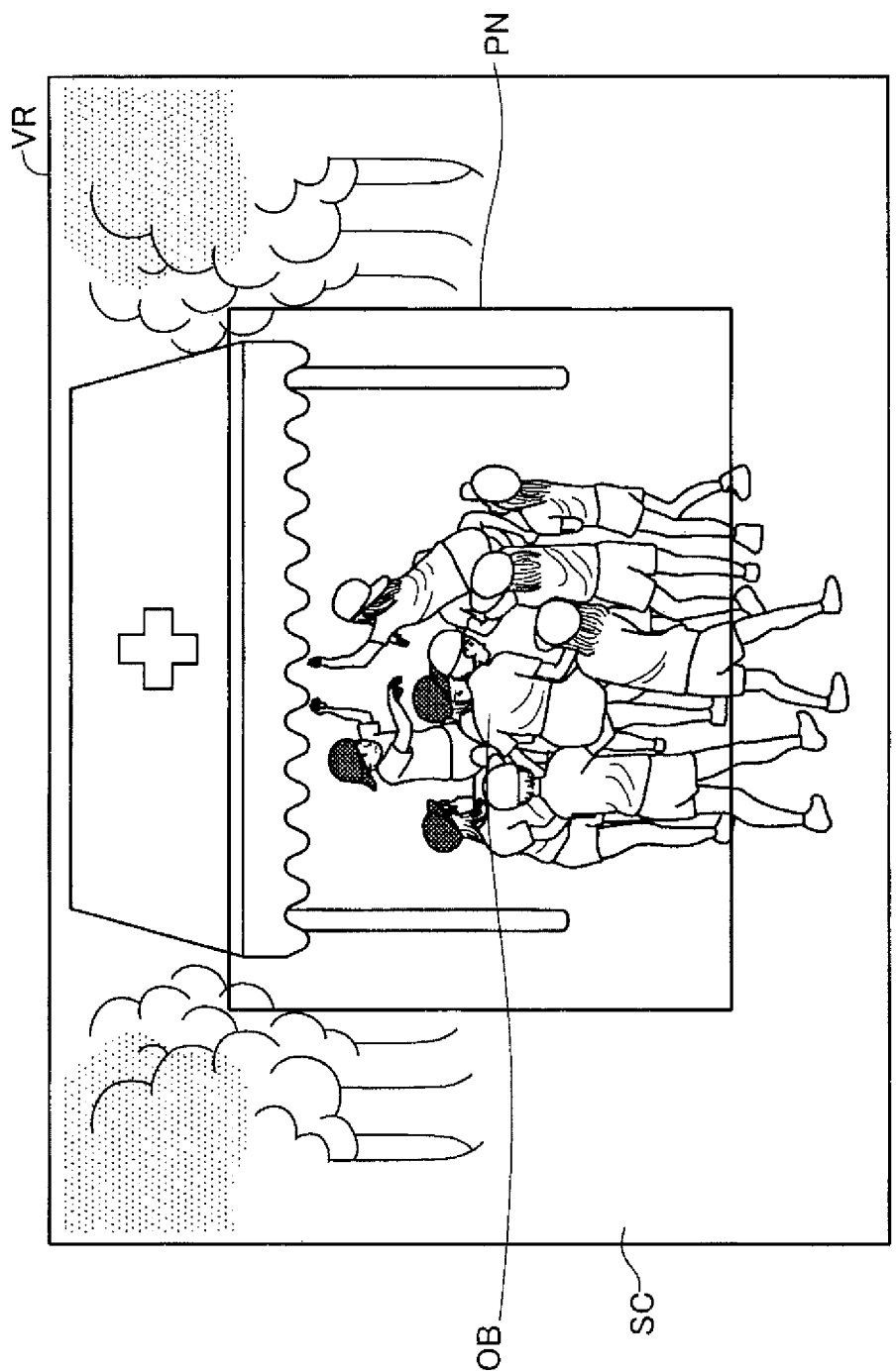
FIG. 6 is a diagram illustrating an example of a visual field recognized by a user.

FIG. 5 is a flowchart illustrating a flow of a position image display process of the object OB. The position image display process is a process of causing the user US to visually recognize an image indicating a position of the object OB so that the user US can recognize the position of the object OB. FIG. 6 is a diagram illustrating an example of a visual field VR recognized by the user US. FIG. 6 illustrates external scenery SC including the object OB which is transmitted through the image display section 20 and is visually recognized by the user US in a state in which the user US wears the image display section 20 at an athletic meet. In addition, a maximal image display region PN illustrated in FIG. 6 is a maximal region where an image generated by the image display section 20 can be displayed. In addition, the solid line indicating the outline of the maximal image display region PN is shown for describing the present embodiment, and is not actually displayed. Thus, the solid line is not visually recognized by the user US. The maximal image display region PN in the present embodiment has 960 as the number of horizontal pixels and 540 as the number of vertical pixels, but may have a different number of pixels in other embodiments. The maximal image display region PN corresponds to an image formation region in the appended claims.

In the position image display process of the object OB, first, the control section 10 specifies a relative position of the image display section 20 and the object position specifying device 500 (step S310). The control section 10 specifies a current position of the image display section 20 by using the GPS module 134, and the wireless communication unit 132 acquires information indicating a specified current position of the object position specifying device 500. In the present embodiment, since the control section 10 is carried by the user US, and the image display section 20 is worn by the user US, a current position of the control section 10 can be regarded as a current position of the image display section 20. Therefore, the GPS module 134 can specify the current position of the image display section 20. The control section specifies a relative position of the object position specifying device 500 for the image display section 20 on the basis of the current positions of the image display section 20 and the object position specifying device 500. In addition, in other embodiments, the GPS module 134 may be disposed in the image display section 20. The control section 10 corresponds to a position specifying unit in the appended claims.

Next, the direction judgment unit 161 of the control section 10 judges whether or not the object OB is included in a range of an angle of view of the camera 61 (step S320). In the example illustrated in FIG. 6, since the object OB is included in the maximal image display region PN, it is judged that the object OB is included in the range of an angle of view of the camera 61 (step S320 of FIG. 5: YES), and the control section 10 displays an image indicating a position of the object OB in the maximal image display region PN (step S340 of FIG. 5). In addition, a case where the object OB is included in a range of an angle of view of the camera 61 is not limited to a case where the object OB is reflected in the external scenery SC whose image is captured by the camera 61, and also includes a case where an image of the object OB cannot be captured by the camera 61 due to a covering or the like although the object OB is included in the range of an angle of view of the camera 61.

Figure 7:
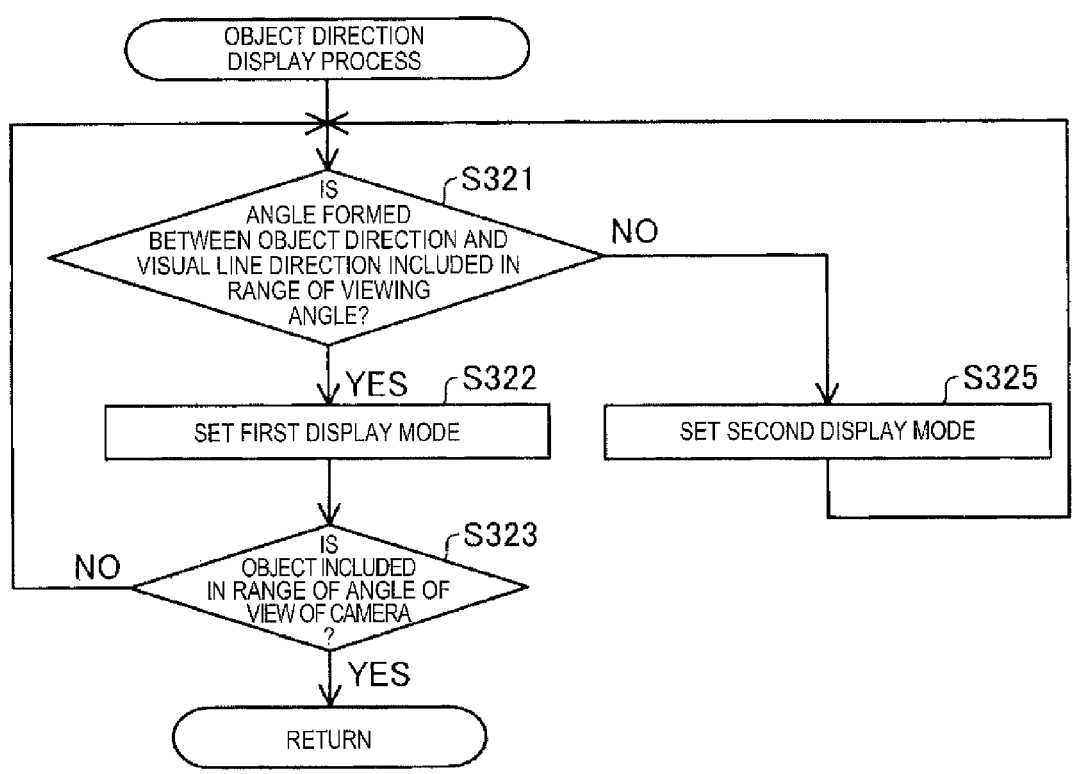
FIG. 7 is a flowchart illustrating a flow of an object direction display process.

If it is judged that the object OB is not included in the range of an angle of view of the camera 61 in the process in step S320 (step S320: NO), the control section 10 performs an object direction display process of displaying an image indicating a direction from the image display section 20 to the object OB (step S330). FIG. 7 is a flowchart illustrating a flow of the object direction display process.

Figure 8:
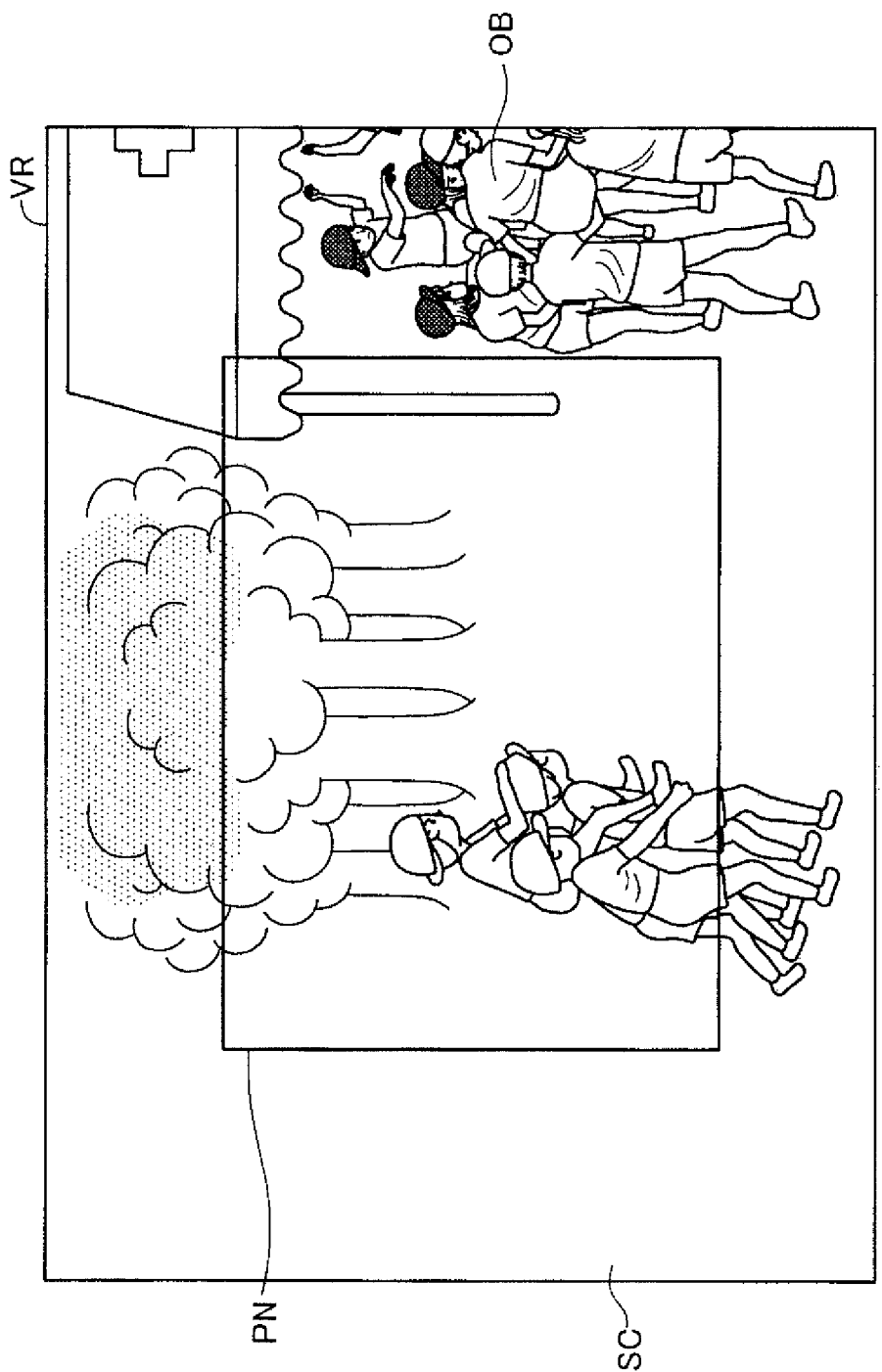
FIG. 8 is a diagram illustrating an example of a visual field recognized by the user.

FIG. 8 is a diagram illustrating an example of a visual field VR recognized by the user US. Unlike in FIG. 6, FIG. 8 illustrates a state in which the object OB deviates to the right relative to the visual line direction of the user US so as to be out of a range of the maximal image display region PN, and is visually recognized within the visual field VR of the user US. In the object direction display process, first, the direction judgment unit 161 judges whether or not an angle formed by the object direction and the visual line direction is in a prescribed range of a viewing angle of the user US (step S321 of FIG. 7). In the example illustrated in FIG. 8, since the object OB is visually recognized within the visual field VR of the user US, it is judged that the object OB is in the range of a viewing angle of the user US in the process in step S321 of FIG. 7 (step S321: YES), and the control section 10 sets a display mode of the image display section 20 to a first display mode (step S322).

Figure 9:
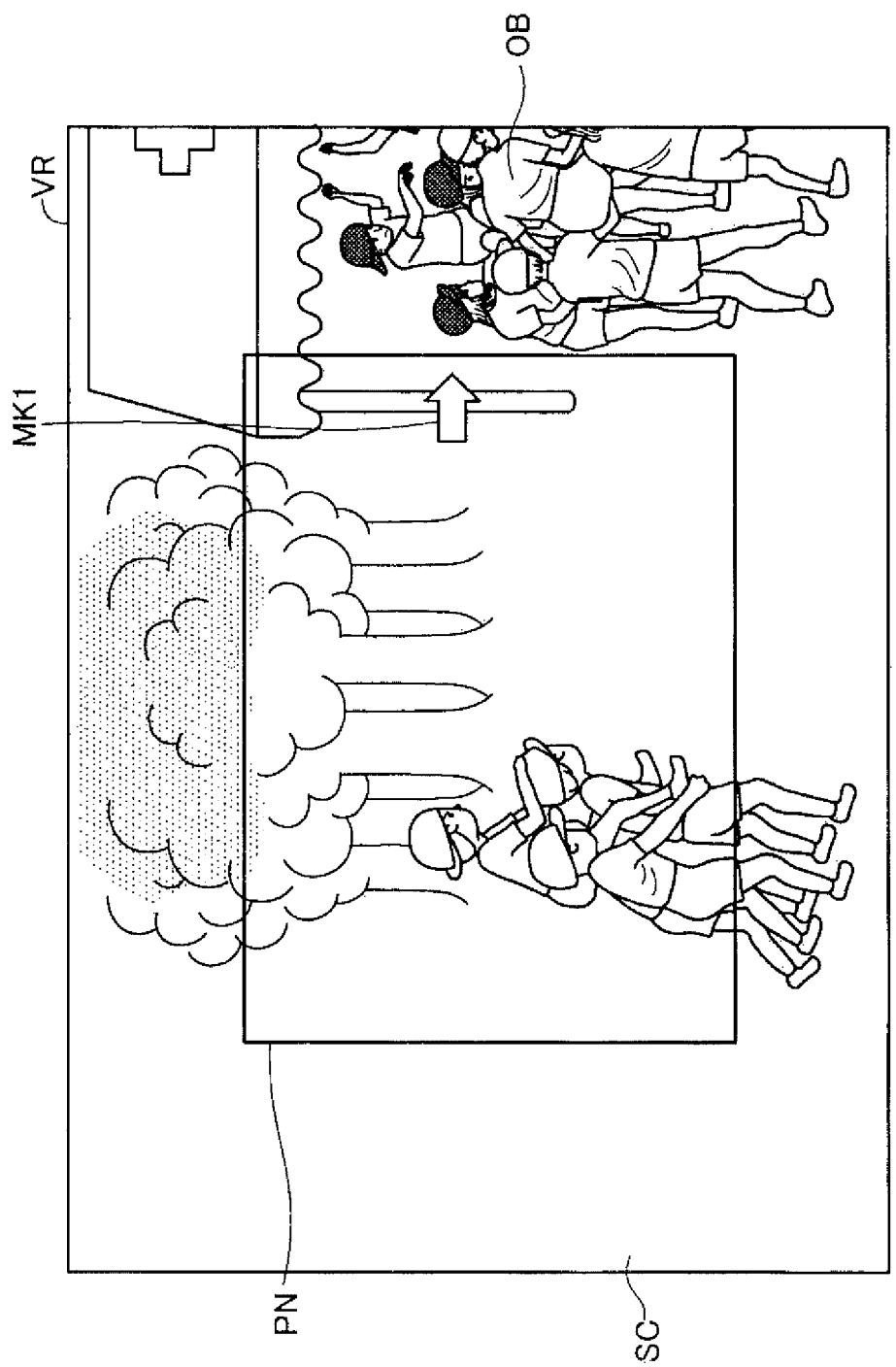
FIG. 9 is a diagram illustrating an example of a visual field recognized by the user.

FIG. 9 is a diagram illustrating an example of a visual field VR recognized by the user US. FIG. 9 illustrates an arrow MK1 as an image indicating a direction of the object OB which is displayed in the maximal image display region PN in a case where a display mode of the image display section 20 is the first display mode. As illustrated in FIG. 9, the object OB is included in the visual field VR of the user US, and is present on the right side outside the maximal image display region PN. For this reason, in the first display mode, the arrow MK1 is displayed at the same height as the height of the object position specifying device 500 in the vertical direction and on the right part in the direction in which the object OB is present in the horizontal direction, in the maximal image display region PN. The control section 10 displays the arrow MK1 which is directed to the right on the right peripheral part in the maximal image display region PN, so as to indicate a direction of the object OB. In addition, in the present embodiment, the peripheral part may be a part excluding the center, and does not necessarily indicate a part near the edge of the maximal image display region PN.

Next, the direction judgment unit 161 monitors whether or not the object OB is included in the range of an angle of view of the camera 61 (step S323). In a case where the object OB is not included in the range of an angle of view of the camera 61 (step S323: NO), the direction judgment unit 161 performs the process in step S321 again. In a case where the object OB is included in the range of an angle of view of the camera 61 (step S343: YES), the control section 10 finishes the object direction display process of the object OB.

Figure 10:
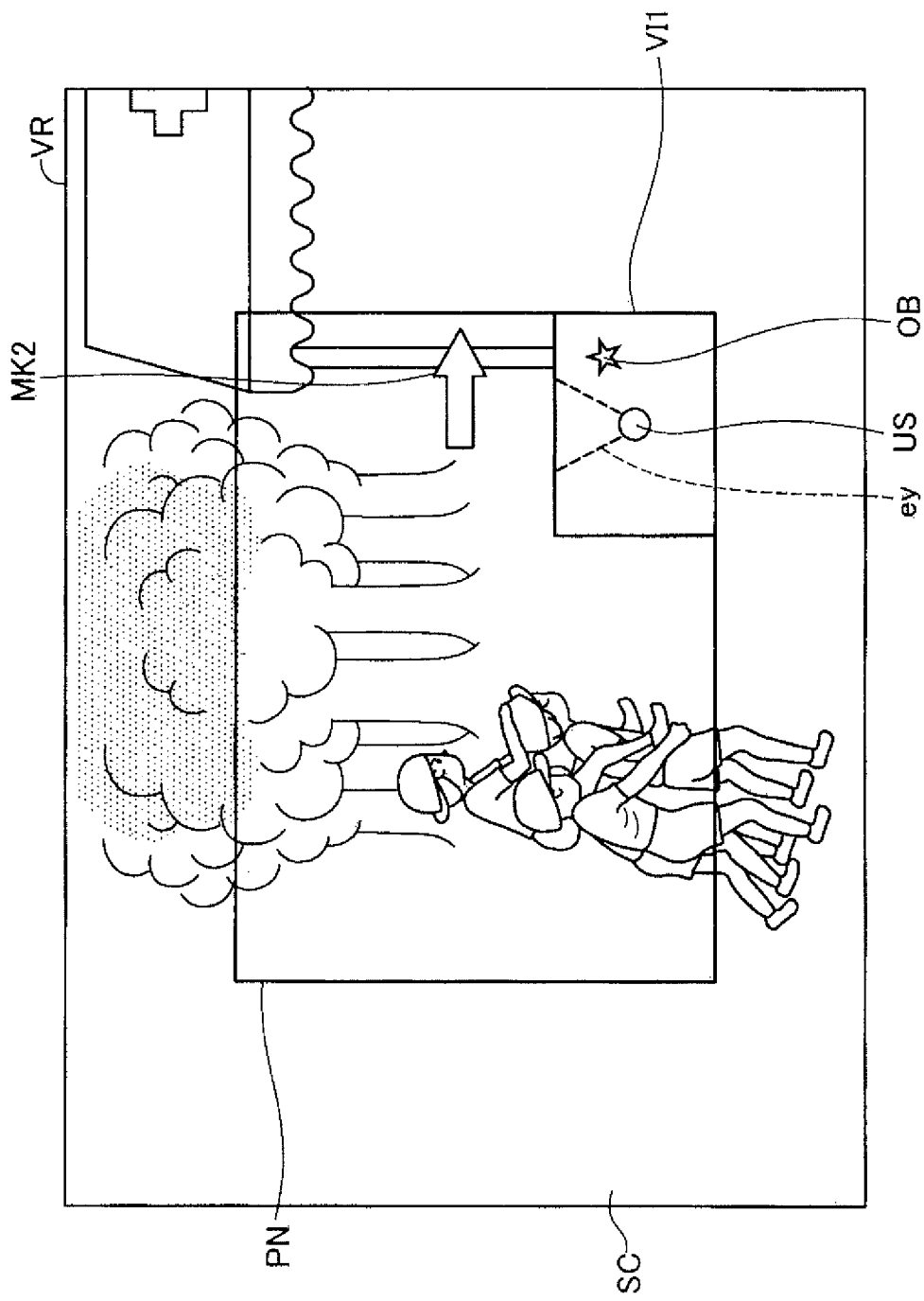
FIG. 10 is a diagram illustrating an example of a visual field recognized by the user.

If it is judged that the object OB is out of the range of a viewing angle of the user US in the process in step S321 (step S321: NO), the control section 10 sets a display mode of the image display section 20 to a second display mode (step S325). FIG. 10 is a diagram illustrating an example of a visual field VR recognized by the user US. FIG. 10 illustrates an arrow MK2 as an image indicating a direction of the object OB which is displayed in the maximal image display region PN and a bird's eye view VI1 in a case where a display mode of the image display section 20 is the second display mode. As illustrated in FIG. 10, the object OB is not included in the visual field VR of the user US. The arrow MK2 is displayed on the upper right part in the maximal image display region PN, and is an arrow image longer than the arrow MK1 illustrated in FIG. 9. For this reason, the control section 10 can allow the user US to instinctively recognize how great an angle formed by the object direction and the visual line direction is using a length of the arrow by displaying the arrow MK2 as longer than the arrow MK1.

The bird's eye view VI1 in the second display mode is displayed in the lower right region which is a peripheral part excluding the center in the maximal image display region PN. The region in which the bird's eye view VI1_is displayed is the lower right region among nine regions obtained by dividing the maximal image display region PN into three regions both vertically and horizontally, and has 320 as the number of horizontal pixels and 180 as the number of vertical pixels. In addition, in other embodiments, the bird's eye view Vii may be different in a display region or a display position in the maximal image display region PN. Further, peripheral parts excluding the center in the maximal image display region EN are parts excluding a single central region of the nine regions. The peripheral parts in the maximal image display region EN are more preferably parts excluding four central regions among sixteen regions obtained by dividing the maximal image display region PN into four regions both vertically and horizontally. As illustrated in FIG. 10, in the bird's eye view Vii, the upward direction from the user US is regarded as a visual line direction of the user US, an expected visual field range eye of the user US is indicated by the dotted line, and a relative relationship between a position of the image display section 20 and a position of the object OB is illustrated as if viewed from above. The position of the user US and the position of the object OB displayed in the bird's eye view VI1 are changed in real time due to a change in the visual line direction of the user US, a change in the relative position caused by movements of the user US and the object OB, and the like. Thereafter, if a direction of the image display section 20 is changed, the control section 10 performs processes in and after step S321 of FIG. 7.

Figure 11:
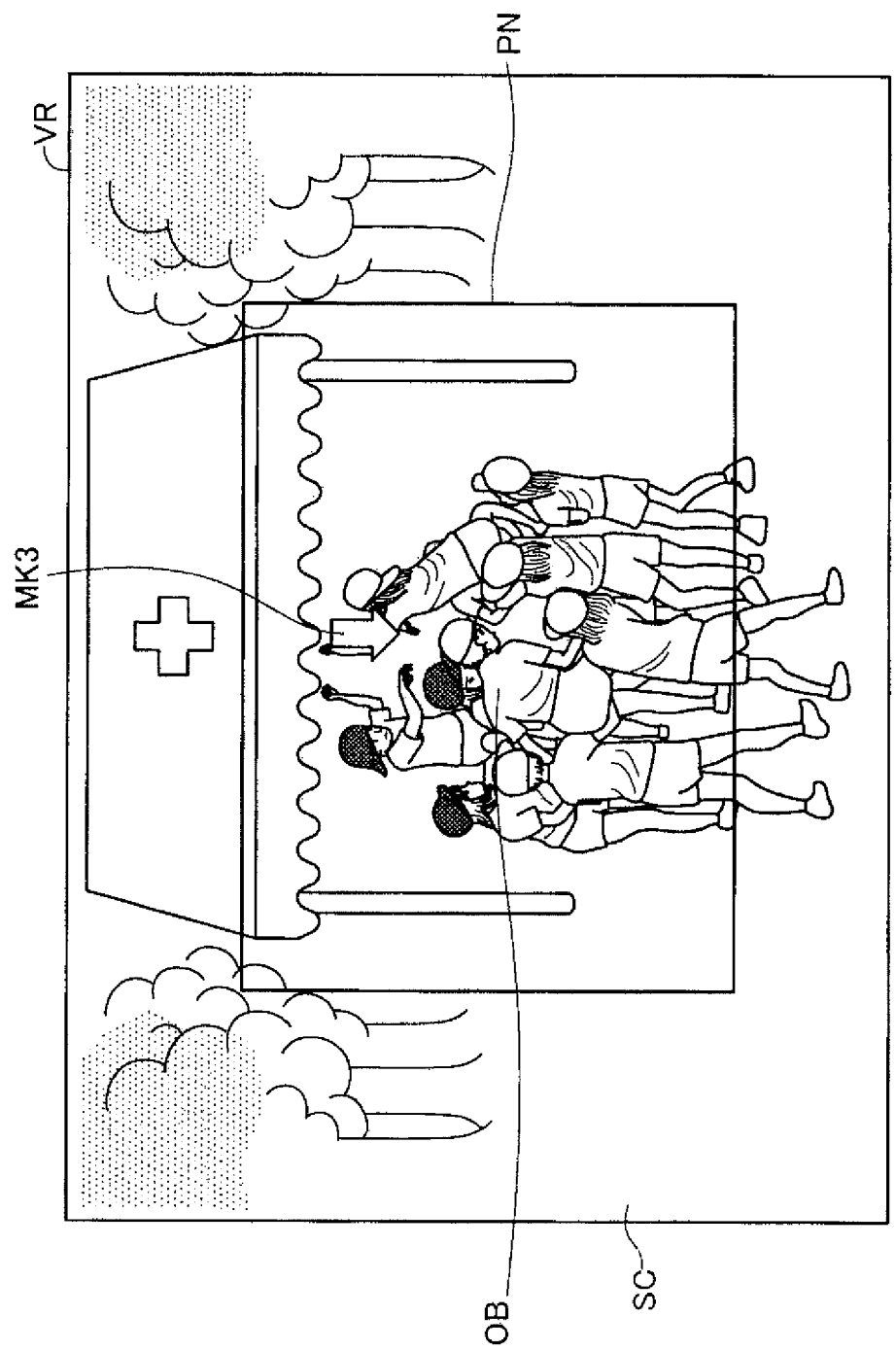
FIG. 11 is a diagram illustrating an example of a visual field recognized by the user.

If the object direction display process is completed, next, the control section 10 displays an image indicating the position of the object OB in the maximal image display region PN (step S340 of FIG. 5). FIG. 11 is a diagram illustrating an example of a visual field VR recognized by the user US. As illustrated in FIG. 11, an arrow MK3 indicating a position of the object OB is displayed above the object OB in the maximal image display region PN. In the present embodiment, a range of an angle of view of the camera 61 is set to be substantially the same as the maximal image display region PN. Therefore, the control section 10 can display the arrow MK3 so as to correspond to the position of the object OB of the external scenery SC in the maximal image display region PN. The arrow MK3 is preferably displayed so as not to overlap with the object OB, and is thus displayed upward at a predetermined distance from the position of the object position specifying device 500 worn by the object OB. In addition, the arrow MK1, the arrow MK2, the arrow MK3, and the bird's eye view VI1 correspond to a target position display image in the appended claims. Further, the arrow MK1, the arrow MK2, and the bird's eye view VI1 correspond to a target direction estimation image in the appended claims.

Figure 12:
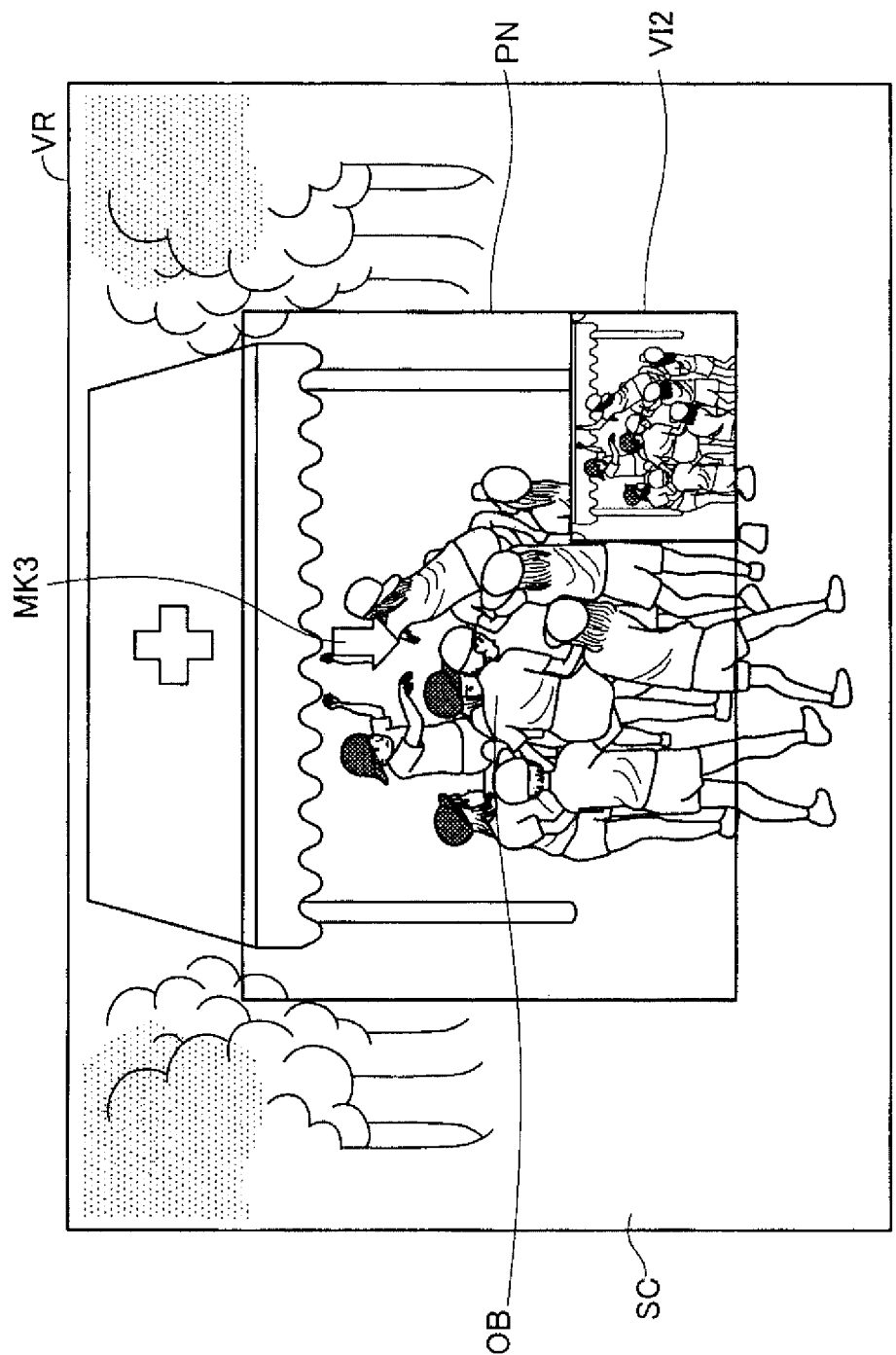
FIG. 12 is a diagram illustrating an example of a visual field recognized by the user.

Next, when the operation unit 135 receives a predetermined operation from the user US, the control section 10 sets a display mode of the image display section 20 to a standby mode before images captured by the camera 61 start being recorded (step S350 of FIG. 5). FIG. 12 is a diagram illustrating an example of a visual field VR recognized by the user US. In addition to the example illustrated in FIG. 11, FIG. 12 illustrates a captured image VI2 obtained by the camera 61, recorded in the maximal image display region PN at a reduced size when recording starts. As illustrated in FIG. 12, the captured image VI2 is displayed in the same region as the bird's eye view VI1 on the lower right part in the maximal image display region EN.

Next, when the operation unit 135 receives a recording start operation from the user US, the control section 10 starts recording of a captured image obtained by the camera 61 (step S360 of FIG. 5). When the recording starts, text of "recording" is displayed on the upper left of the captured image VI2 illustrated in FIG. 12. In addition, in other embodiments, text other than "recording" may be displayed, and the text may be displayed at different positions in the maximal image display region PN. Therefore, the user US can naturally confirm the captured image VI2 of which recording is in progress, in particular even without changing a direction of the head or the like, while recognizing the visual field VR.

Next, the control section 10 monitors whether or not the object OB is continuously included in the range of an angle of view of the camera 61 during the recording (step S370). In a case where the object OB is included in the range of an angle of view of the camera 61 (step S370: YES), the control section 10 monitors whether or not there is an input to the operation unit 135 for finishing the recording (step S390).

If the object OB is not included in the range of an angle of view of the camera 61 in the process in step S370 (step S370: NO), the control section 10 performs the same object direction display process as in step S330 (step S380). In the object direction display process in step S380, the control section 10 continuously performs recording of a captured image in the present embodiment, but the recording may automatically stop in a case where the object OB is not included in the range of an angle of view of the camera 61 in other embodiments. In addition, in a case where the object OB is not included in the range of an angle of view of the camera 61, the control section 10 may display a selection image for determining whether or not the recording continues to be performed in the maximal image display region PN, and whether or not the recording is performed may be determined based on an operation received by the operation unit 135. Further, the process in step S380 is the same as the object direction display process illustrated in FIG. 7, and thus description thereof will be omitted.

When the object direction display process in step S380 is completed, next, the control section 10 displays an image indicating the position of the object OB in the maximal image display region PN (step S385 of FIG. 5). Subsequently, the control section 10 monitors whether or not there is an input to the operation unit 135 for finishing the recording (step S390). In a case where the operation unit 135 receives an operation for finishing the recording from the user US (step S390: YES), the control section 10 finishes the recording of a captured image obtained by the camera 61. In a case where the operation unit 135 does not receive an operation for finishing the recording in the process in step S390 (step S390: NO), subsequently, the direction judgment unit 161 monitors whether or not the object OB is included in the range of an angle of view of the camera 61 in a state in which the recording of a captured image is performed (step S370).

As described above, in the head mounted display 100 of the present embodiment, the control section 10 specifies a current position of the image display section 20 and acquires information indicating a current position of the object position specifying device 500 so as to specify a relative position of the object position specifying device 500 for the image display section 20. The control section 10 causes the image display section 20 to generate an image indicating a position of the object OB in the maximal image display region PN, and sets a position of the generated image in the maximal image display region PN on the basis of the relative position. For this reason, in the head mounted display 100 according to the present embodiment, the user US visually recognizes the image indicating the position of the object OB in the maximal image display region PN of the image display section 20 mounted on the head of the user US. Therefore, the user US can recognize the position of the object OB even without moving the head, and thus convenience to the user US improves. In addition, if the object position specifying device 500 is attached to the object OB in advance, the user US can grasp a direction in which the object OB is present even if the user US cannot directly visually recognize the object OB due to some covering.

Further, in the head mounted display 100 according to the present embodiment, the camera 61 captures an image of the external scenery SC in the range of an angle of view of the camera 61 centering on the visual line direction of the user US. For this reason, in the head mounted display 100 according to the present embodiment, an image of external scenery SC which is substantially the same as the external scenery SC visually recognized by the user US can be captured, and thus the user US is not required to intentionally confirm an image of which capturing is in progress. Therefore, an image of the external scenery SC is easily captured, and convenience to the user US improves.

Furthermore, in the head mounted display 100 according to the present embodiment, the direction judgment unit 161 judges whether or not the object OB is included in the range of an angle of view of the camera 61. If the direction judgment unit 161 judges that the object OB is included in the range of an angle of view of the camera 61, the control section 10 displays the arrow MK3 near the object OB in the maximal image display region PN. If the direction judgment unit 161 judges that the object OB is not included in the range of an angle of view of the camera 61, the control section 10 displays an image indicating a direction of the object OB as in the arrow MK1 and the arrow MK2 in the maximal image display region PN. Therefore, in the head mounted display 100 according to the present invention, since a position of an image indicating the object OB is different in states in which the object OB is visually recognized and is not visually recognized by the user US, the user US easily judges whether or not the object OB is included in the range of an angle of view of the camera 61, and convenience to the user US improves.

In addition, in the head mounted display 100 according to the present embodiment, in a case where a display mode of the image display section 20 is the second display mode, an upward direction from the user US is regarded as the visual line direction of the user US, and a relative relationship between a position of the image display section 20 and a position of the object OB is shown in the bird's eye view VI1 displayed in the maximal image display region PN. For this reason, in the head mounted display 100 according to the present embodiment, when the user US cannot visually recognize the object OB, a relative position of the object OB relative to the user US can be visually recognized. Thus, the object OB is easily found, and convenience to the user US improves.

Further, in the head mounted display 100 according to the present embodiment, the control section 10 displays a captured image obtained by the camera 61 on the image display section 20 as an image of a region smaller than the maximal image display region PN. For this reason, in the head mounted display 100 according to the present invention, the user US can visually recognize a captured image obtained by the camera 61 along with the external scenery SC without being obstructed by the external scenery SC which can be visually recognized through the image display section 20. Therefore, convenience to the user US improves. Furthermore, the control section 10 sets a position where a captured image is displayed in the maximal image display region PN to a peripheral part excluding the center in the maximal image display region PN. Therefore, in the head mounted display 100 according to the present embodiment, the user US more easily visually recognizes the external scenery SC, and convenience to the user US further improves.

B. Another Embodiment

Figure 15:
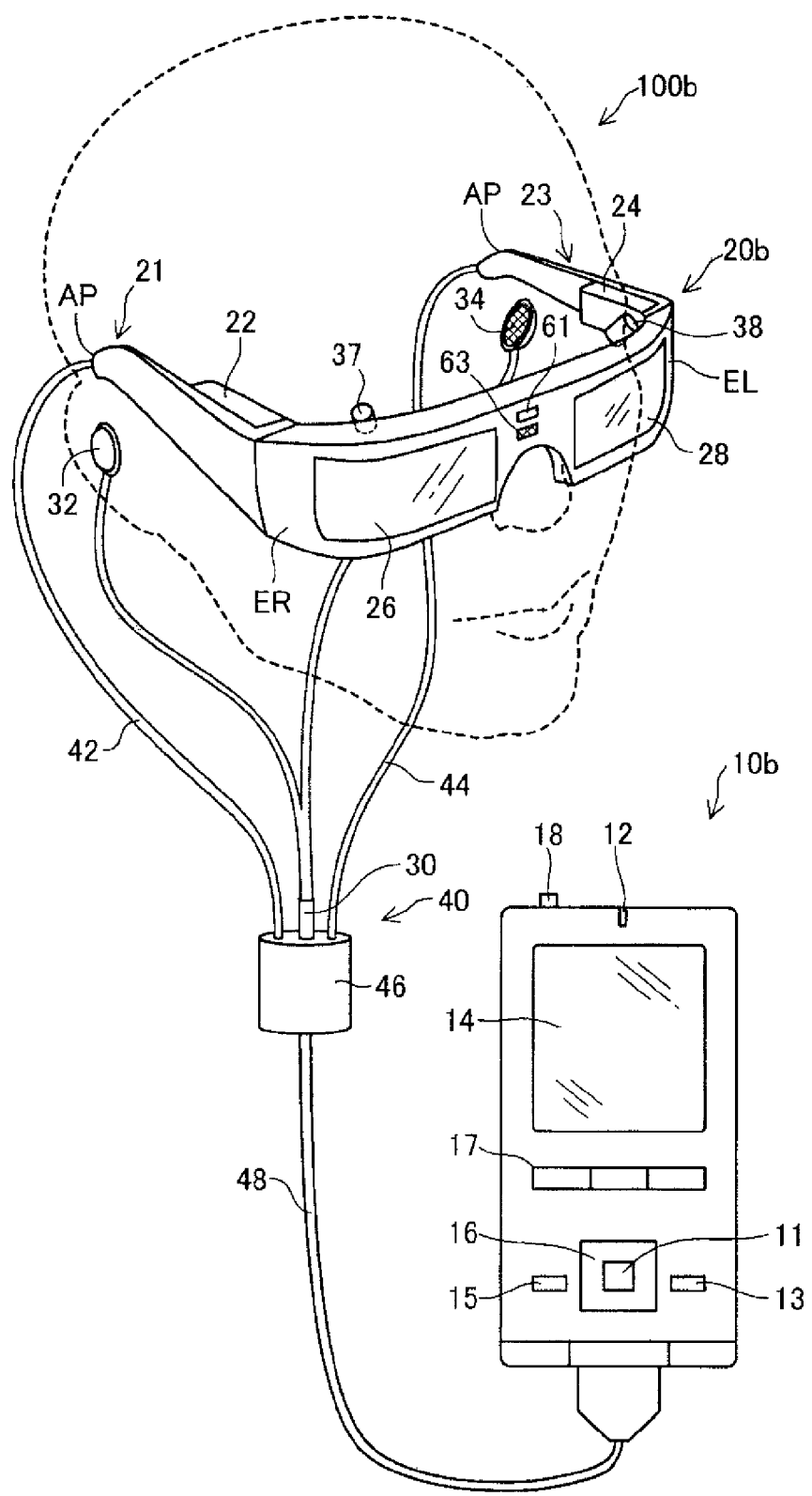
FIG. 15 is a diagram illustrating an exterior configuration of a head mounted display according to another embodiment.
Figure 16:
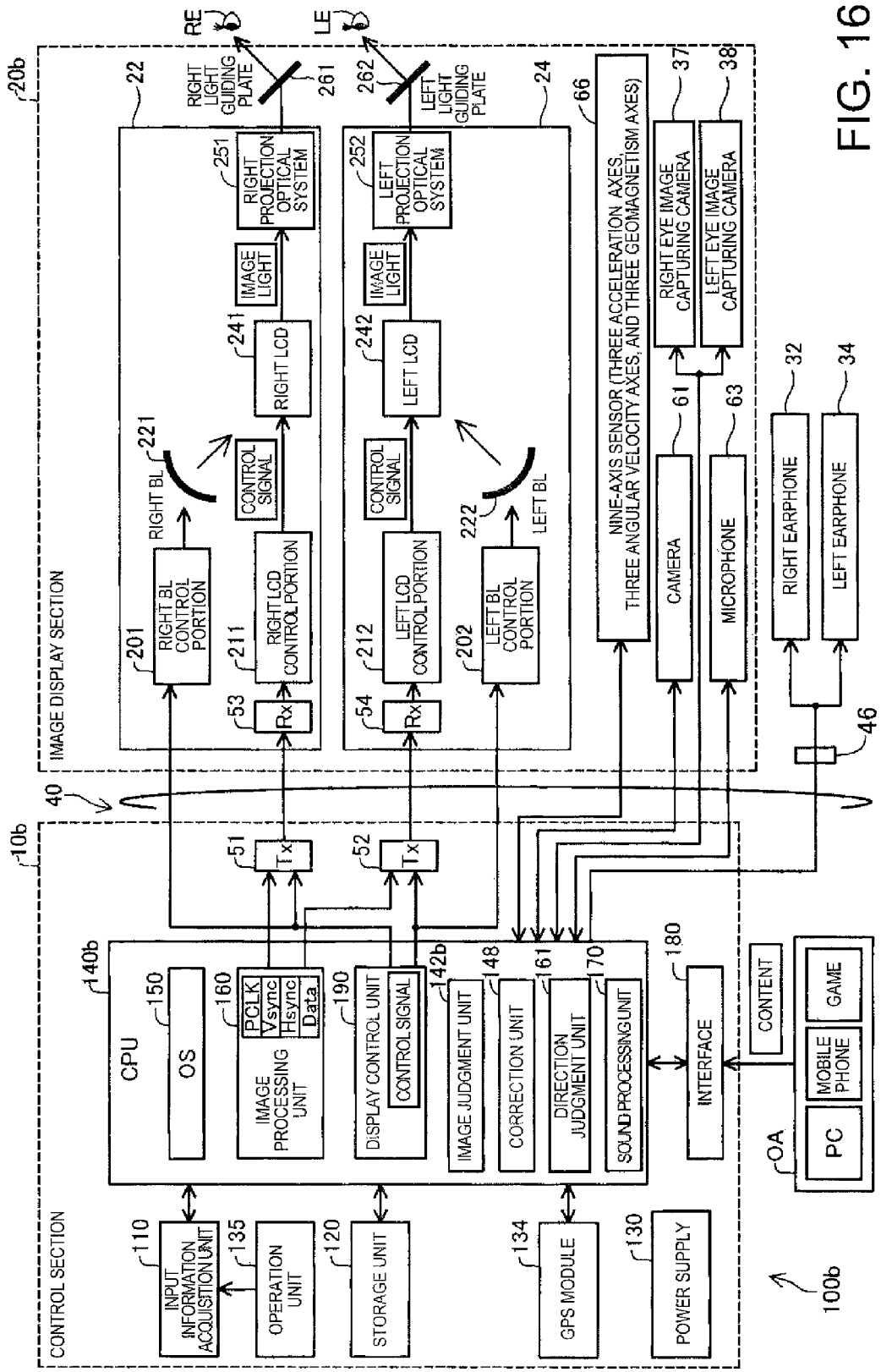
FIG. 16 is a functional block diagram illustrating a configuration of the head mounted display according to another embodiment.

FIG. 15 is a diagram illustrating an exterior configuration of a head mounted display 100b according to another embodiment. FIG. 16 is a functional block diagram illustrating a configuration of the head mounted display 100b according to another embodiment. As illustrated in FIGS. 15 and 16, another embodiment is different from the first embodiment in that an image display section 20b includes a right eye image capturing camera 37 and a left eye image capturing camera 38, and a CPU 140b includes an image correction unit 148. The right eye image capturing camera 37 and the left eye image capturing camera 38 (hereinafter, also referred to as eye image capturing cameras 37 and 38) are small-sized CCD cameras which respectively capture the right eye and the left eye of the user US. The image correction unit 148 corrects blurring in an image captured by the camera 61 optically or electronically, so that the image is revised so as not to have the blurring.

In addition, in another embodiment, an image judgment unit 142b analyzes a right eye image and a left eye image of the user US, respectively captured by the eye image capturing cameras 37 and 38, so as to specify a visual line direction of the user US. For example, the image judgment unit 142b analyzes a positional relationship between the captured images of the iris and the whites of the eyes of the user US so as to specify a visual line direction of the user US. Further, the eye image capturing cameras 37 and 38 and the image judgment unit 142b correspond to a visual line direction specifying unit in the appended claims. Furthermore, the black eye part, the white eye part, and open and closed states of the eyelid of the user US, specified by the eye image capturing cameras 37 and 38 and the image judgment unit 142b, correspond to eye states in the appended claims.

Figure 17:
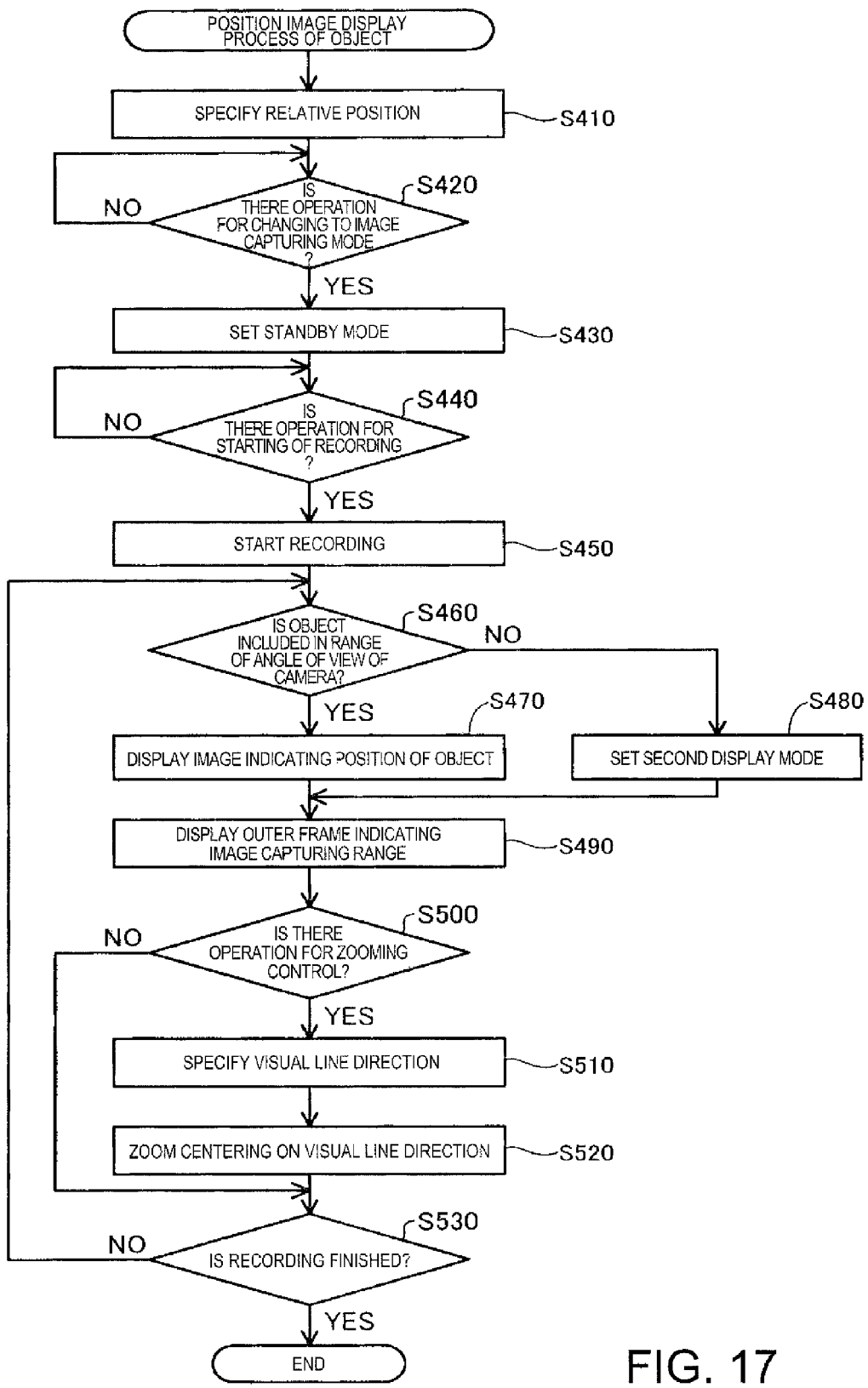
FIG. 17 is a flowchart illustrating a flow of a position image display process of an object according to another embodiment.

FIG. 17 is a diagram illustrating a flow of a position image display process of the object OB according to another embodiment. In the position image display process according to another embodiment, a control section 10b enlarges or reduces an image capturing range (hereinafter, simply referred to as "performs zooming control") with respect to a specified visual line direction of the user US by receiving a predetermined operation.

In another embodiment, first, when a relative position of the image display section 20b and the object position specifying device 500 is specified (step S410), the control section 10b monitors whether or not an operation for changing to an image capturing mode is received (step S420). In a case where the operation unit 135 does not receive an operation for changing to the image capturing mode (step S420: NO), subsequently, the control section 10b monitors whether or not a predetermined operation for changing to the image capturing mode is received (step S420). In a case where the operation unit 135 receives an operation for changing to the image capturing mode (step S420: YES), the control section 10b sets a display mode of the image display section 20b to a standby mode (for example, FIG. 12) (step S430 of FIG. 17).

When the standby mode is set, the control section 10b monitors whether or not a predetermined operation for starting of recording is received (step S440). In a case where the operation unit 135 does not receive an operation for starting of recording (step S440: NO), subsequently, the control section 10b monitors whether or not an operation for starting of recording is received (step S440). In a case where the operation unit 135 receives an operation for starting of recording (step S440: YES), the control section 10b starts recording of a captured image (step S450).

Figure 18:
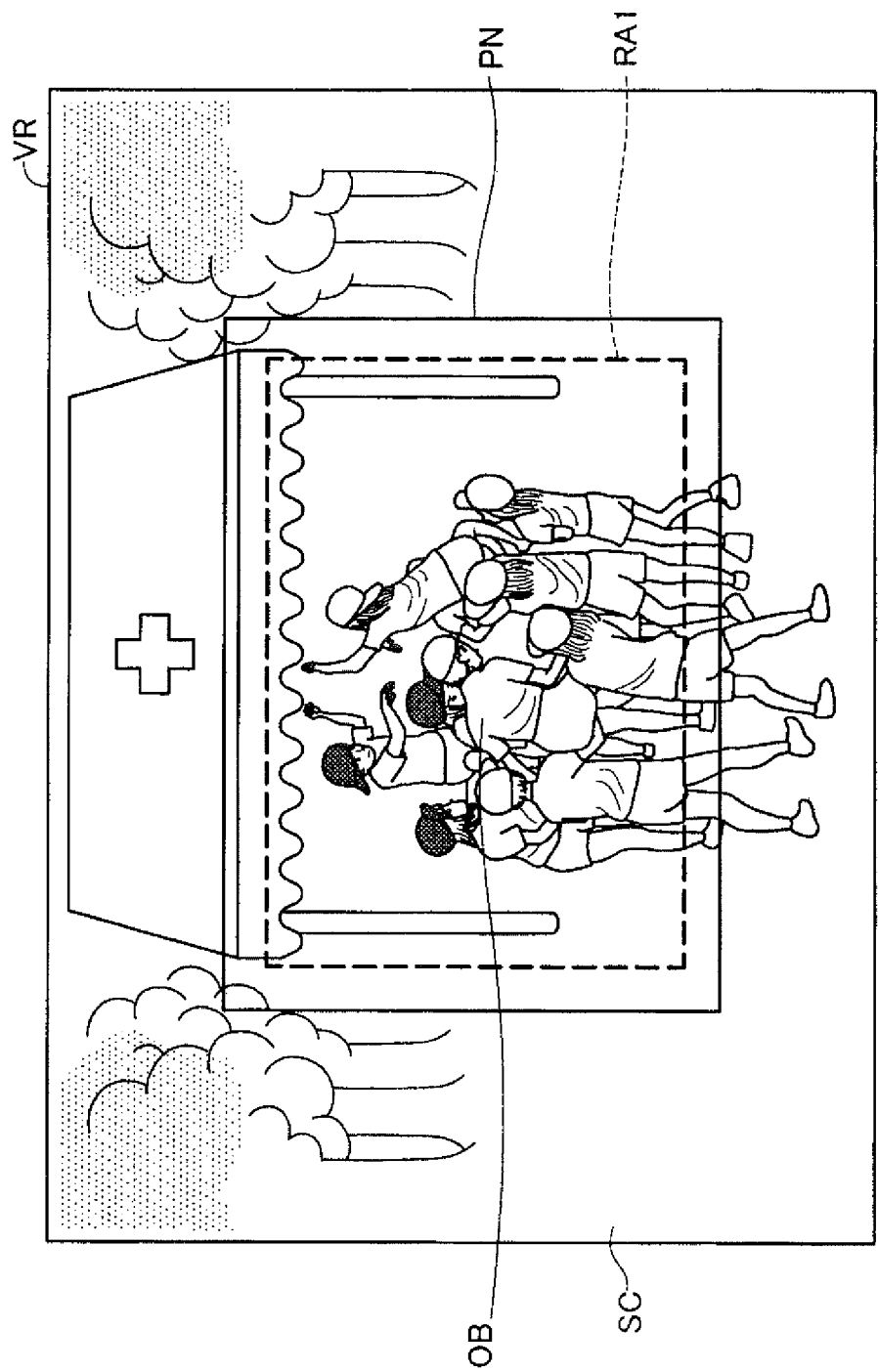
FIG. 18 is a diagram illustrating an example of a visual field recognized by the user when an outer frame indicating an image capturing range is displayed.

When recording of a captured image starts, the direction judgment unit 161 judges whether or not the object OB is included in the range of an angle of view of the camera 61 (step S460). If it is judged that the object OB is included in the range of an angle of view of the camera 61 (step S460: YES), the control section 10*b* displays an image indicating a position of the object OB in the maximal image display region PN (step S470). FIG. 18 is a diagram illustrating an example of a visual field VR recognized by the user US in a case where an outer frame RA1 indicating an image capturing range is displayed. As illustrated in FIG. 18, the control section 10*b* displays the outer frame RA1 indicating an image capturing range in the maximal image display region PN (step S490 of FIG. 17). The camera 61 captures an image of the interior of the outer frame RA1 and does not capture an image of the outside thereof.

Figure 19:
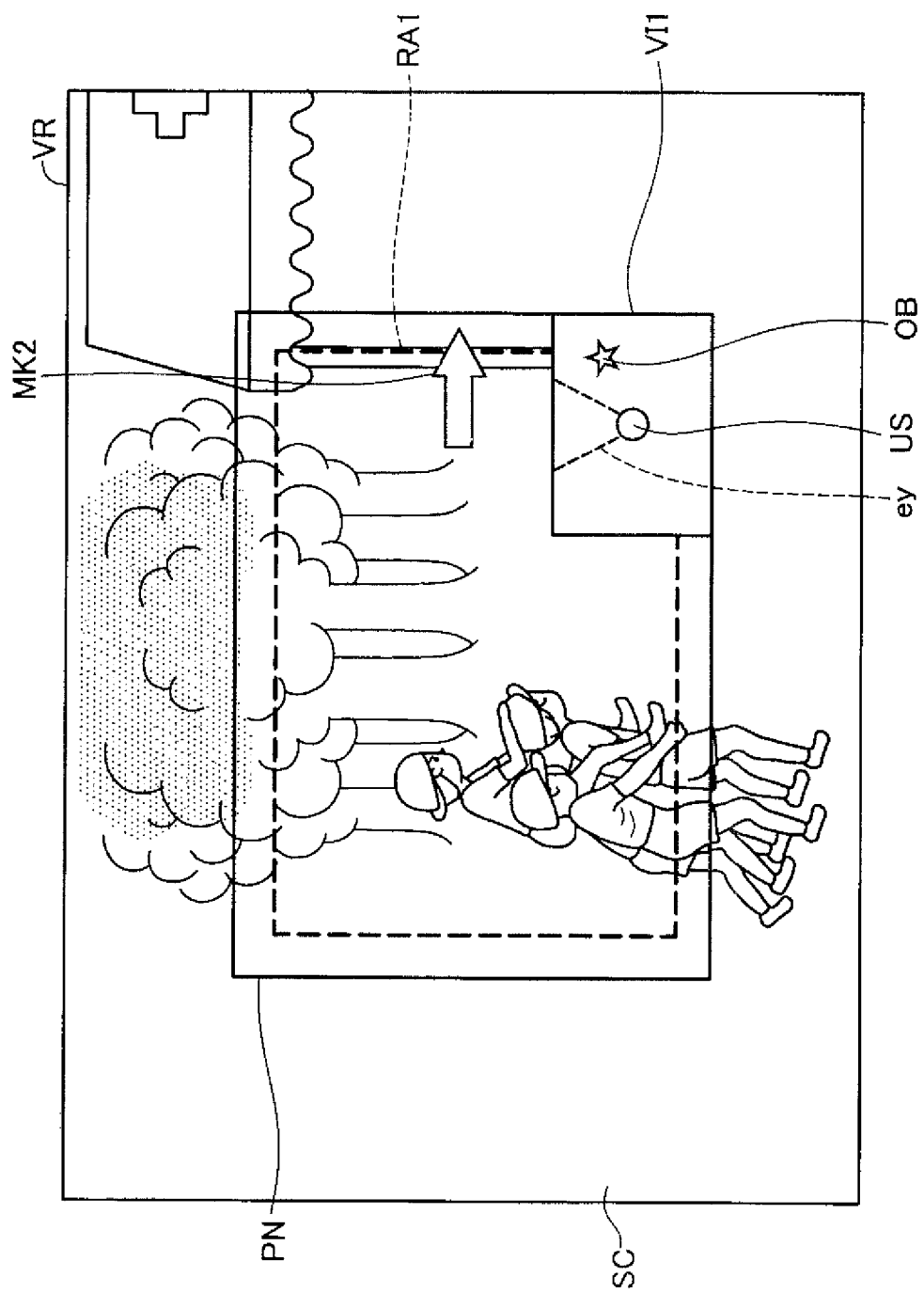
FIG. 19 is a diagram illustrating an example of a visual field recognized by the user in a second display mode.

If it is judged that the object OB is not included in the range of an angle of view of the camera 61 in the process in step S460 (step S460: NO), the control section 10*b* sets a display mode of the image display section 20*b* to the second display mode (step S480). FIG. 19 is a diagram illustrating an example of a visual field VR recognized by the user US in the second display mode. As illustrated in FIG. 19, in the second display mode, the control section 10*b* displays the outer frame RA1 indicating an image capturing range in the maximal image display region PN in the same manner as in the case where the object OB is included in the range of an angle of view of the camera 61 (step S490 of FIG. 17).

When the outer frame RA1 indicating an image capturing range is displayed, the control section 10*b* monitors whether or not an operation for performing zooming control is received (step S500). In a case where the operation unit 135 receives an operation for performing zooming control (step S500: YES), the eye image capturing cameras 37 and 38 and the image judgment unit 142*b* of the control section 10*b* specify a visual line direction of the user US (step S510). Next, the control section 10*b* performs zooming control of the image capturing range centering on the specified visual line direction of the user US in response to the operation received by the operation unit 135 (step S520).

Figure 20:
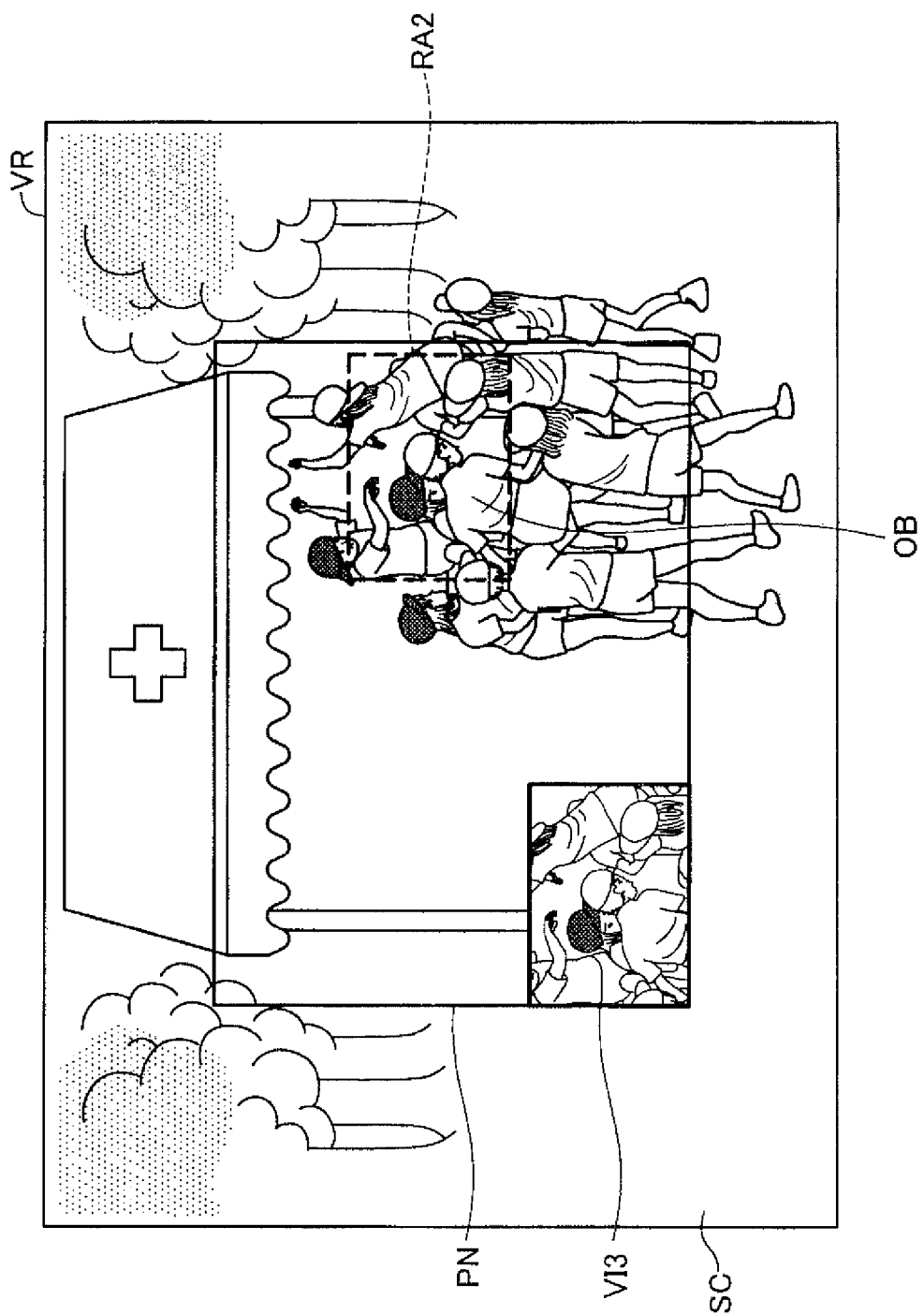
FIG. 20 is a diagram illustrating an example of a visual field recognized by the user when an image capturing range is enlarged centering on a visual line direction.

FIG. 20 is a diagram illustrating an example of a visual field VR recognized by the user US in a case where an image capturing range is enlarged centering on the visual line direction. As illustrated in FIG. 20, a captured image recorded centering on the object OB in the specified visual line direction of the user US is displayed as a captured image VI3 on the lower left of the maximal image display region PN. In addition, an outer frame RA2 indicating an image capturing range after the zooming control is performed is displayed in the maximal image display region PN. In another embodiment, as above, zooming control of an image capturing range is performed not centering on an image capturing range of the camera 61 but centering on the specified visual line direction of the user US through digital zooming.

In a case where zooming control of an image capturing range has been performed (step S520 of FIG. 17) or the control section 10*b* does not receive an operation for zooming control (step S500: NO), the control section 10*b* monitors whether or not there is an input to the operation unit 135 for finishing the recording (step S530).

As described above, in the head mounted display 100*b* according to another embodiment, the image judgment unit 142*b* and the eye image capturing cameras 37 and 38 specify a visual line direction of the user US, and the control section 10*b* enlarges or reduces an image capturing range on the basis of the specified visual line direction of the user US. For this reason, in the head mounted display 100*b* according to another embodiment, a range which is desired to be visually recognized by the user US, for example, a predetermined range centering on a visual line direction can be enlarged or reduced to be visually recognized by the user US, and thus convenience to the user US improves.

In addition, in the head mounted display 100*b* according to another embodiment, since the control section 10*b* displays the outer frame RA1 indicating an image capturing range in the maximal image display region PN (for example, FIG. 19), the image capturing range can be recognized by the user US as visual information, and thus convenience to the user US improves.

Further, in the head mounted display 100*b* according to another embodiment, since the image correction unit 148 corrects blurring of a captured image so that the image is revised so as not to have the blurring, it is possible to provide a clear captured image by correcting blurring of the image caused by unintended shaking of the head of the user US.

C. Modification Examples

In addition, the invention is not limited to the above-described embodiments, and can be implemented in various aspects within the scope without departing from the spirit thereof. For example, the following modifications are possible.

C1. Modification Example 1

Figure 13:
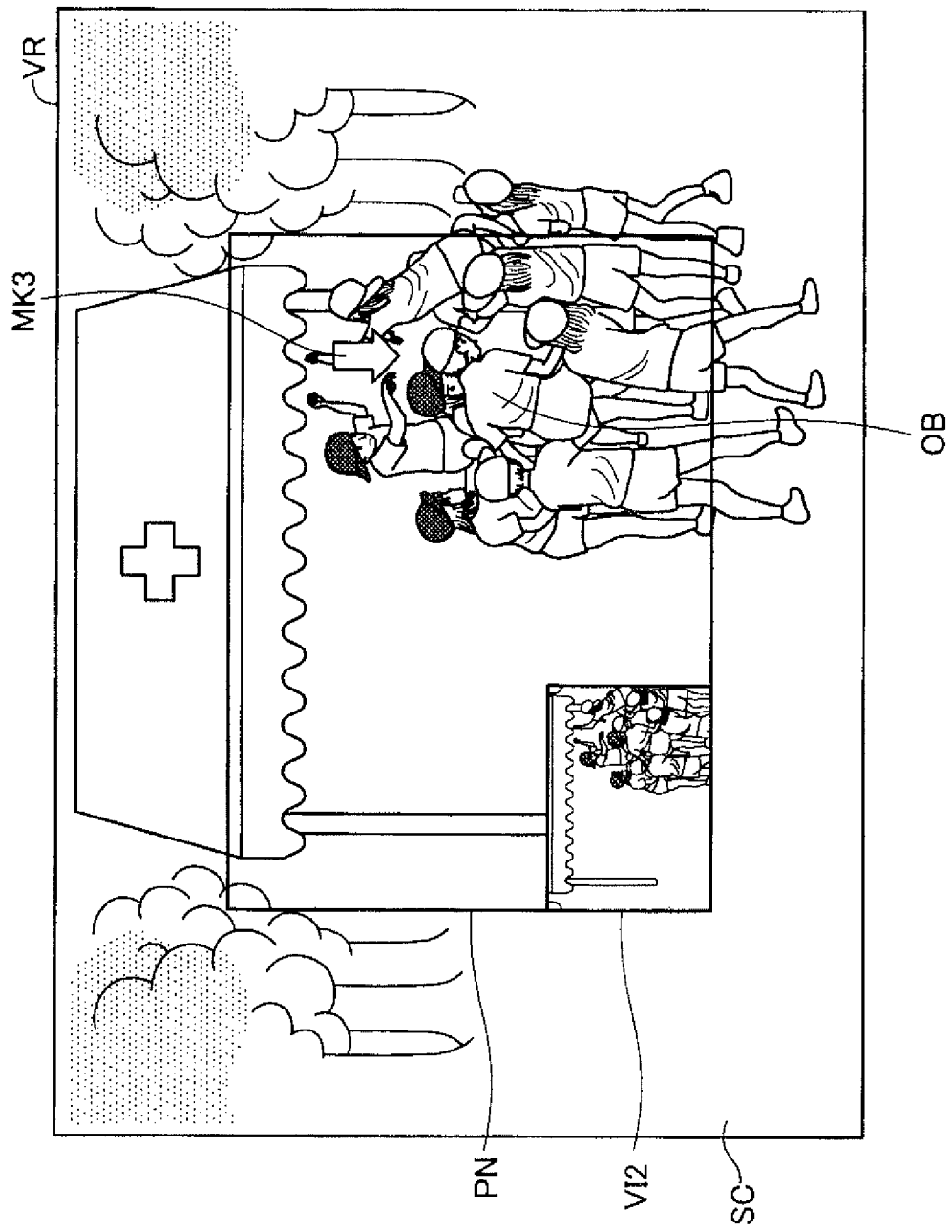
FIG. 13 is a diagram illustrating an example of a visual field recognized by the user.

In the above-described embodiments, as illustrated in FIG. 12, a description has been made of an aspect in which the bird's eye view VI1 and the captured image VI2 are displayed in the lower right region when the maximal image display region PN is divided into nine regions, but the region where the bird's eye view VI1 and the captured image VI2 are displayed may have various modifications. FIG. 13 is a diagram illustrating an example of a visual field VR recognized by the user US. In FIG. 13, unlike in FIG. 12 in the above-described embodiments, a position where the captured image VI2 is displayed in the maximal image display region PN is different. In the head mounted display 100 of Modification Example 1, the control section 10 sets a position where the captured image VI2 is displayed in the maximal image display region EN, to a position which does not overlap with the object OB in the maximal image display region EN on the basis of a specified positional relationship between the image display section 20 and the object position specifying device 500. For this reason, in the head mounted display 100 of Modification Example 1, the user US can visually recognize the object OB in the external scenery SC, and thus convenience to the user US improves.

In addition, based on an operation received by the operation unit 135, the bird's eye view VI1 and the captured image VI2 may change between display and non-display, and a display position and a size of a display region may be changed. In the head mounted display 100 of Modification Example 1, a display aspect of the bird's eye view VI1 and the captured image VI2 is changed based on the intention of the user US, and thus convenience to the user US improves.

Furthermore, images displayed in the maximal image display region PN are not limited to an image indicating a position of the object OB, the bird's eye view VI1, and the captured image VI2, and may have various modifications. For example, in a case where a display mode of the image display section 20 is the second display mode, the control section 10 may calculate a distance between the user US and the object OB on the basis of a relative position of the user US and the object OB, and may display the calculated distance in the maximal image display region PN as an image of a numerical value. Moreover, even if the object OB is included in the range of an angle of view of the camera 61, a display mode of the image display section 20 may be changed based on a distance between the user US and the object OB, and the bird's eye view VI1 may be displayed in the maximal image display region PN at all times. In the head mounted display 100 of Modification Example 1, not only a positional relationship between the user US and the object OB is specified, but also a distance between the user US and the object OB is specified as in the bird's eye view VI1. For this reason, the user US can select an action such as a movement based on the distance or changing of only a visual line direction, and thus convenience to the user US improves.

C2. Modification Example 2

Figure 14:
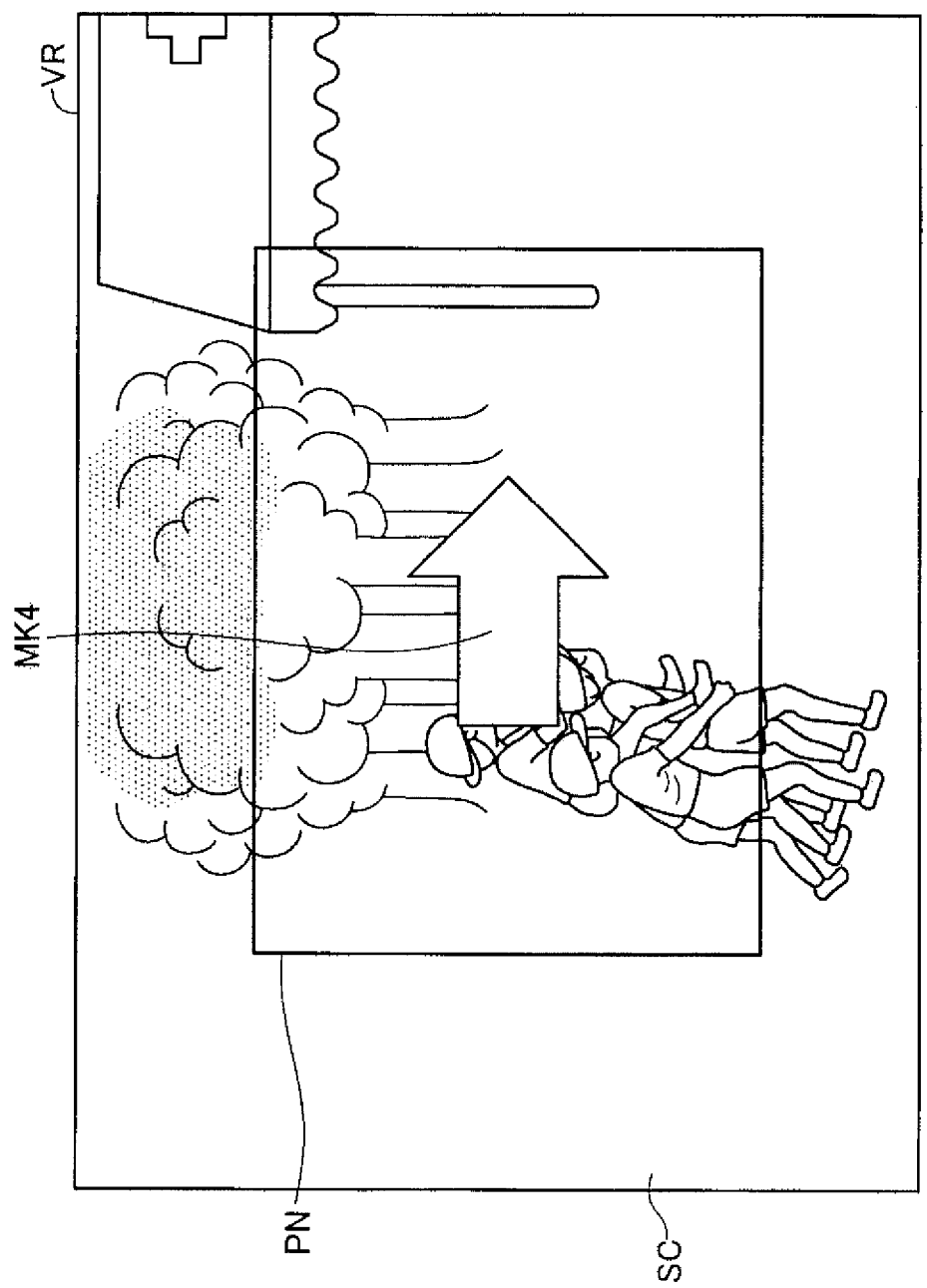
FIG. 14 is a diagram illustrating an example of a visual field recognized by the user.

In the above-described embodiments, an image indicating a position of the object OB, displayed in the maximal image display region PN, and a position of the image in the maximal image display region PN are changed based on a relative position of the object OB for the user US, but the image and the position where the image is displayed are not limited thereto, and may have various modifications. FIG. 14 is a diagram illustrating an example of a visual field VR recognized by the user US. As illustrated in FIG. 14, an arrow MK4 as an image indicating a position of the object OB is displayed in a part including the center of the maximal image display region PN. In FIG. 14, the object OB is not included in the visual field VR of the user US, and the arrow MK4 indicates that the object OB is present on the right of the user US. In the head mounted display 100 of Modification Example 2, in a case where the object OB is included in the visual field VR of the user US, an image such as the arrow MK3 in the above-described embodiment is not displayed in the maximal image display region PN. Only in a case where the object OB is not included in the visual field VR, the image of the arrow indicating the direction of the object OB is displayed at the center which is the same position in the maximal image display region PN.

C3. Modification Example 3

In the above-described embodiments, a position of the object OB is specified by the object position specifying device 500, and a relative position of the image display section 20 and the object position specifying device 500 is specified, but a method of specifying a position of the object OB is not limited thereto, and may have various modifications. For example, a relative position of the image display section 20 and the object position specifying device 500 may not be specified, but only a position of the object position specifying device 500 may be specified, and positions of the image display section 20 and the object position specifying device 500 may be specified separately. In addition, instead of using a GPS satellite, the object OB may carry a transmitter which transmits a signal of a specific frequency in a one-to-one relationship with the head mounted display 100, thereby specifying a position of the object OB. Specific communication methods include wireless LAN, Bluetooth (registered trademark), 4G portable communication, and the like. Further, a position of the object OB may be specified using a portable terminal (for example, a smart phone) or a watch which is carried by or attached to the object OB and has a GPS function. Furthermore, a relative position in the present specification includes not only positions of the image display section 20 and the object position specifying device 500 but also position information such as directions of the image display section 20 and the object position specifying device 500.

In addition, a position of the object OB may be specified by image recognition. For example, when the object OB is a person, an image of the face of the object OB may be registered in advance in the storage unit 120 of the control section 10, and the image judgment unit 142 of the control section 10 may judge that the face of the object OB is included in a captured image obtained by the camera 61, thereby specifying a position of the object OB. Further, in image recognition other than the face of the object dB, a position of the object OB may be specified using a specific marker, a pattern of clothes, a characteristic attachment, and the like. In the head mounted display 100 of Modification Example 2, a position of the object dB can be specified even if a device such as a transmitter is not carried by or attached to the object GB in advance, and thus convenience to the user US improves. Furthermore, a case can be excluded in which a position of the object OB is not specified and the object OB is not reflected in a captured image obtained by the camera 61 due to a covering or the like even if the object dB is included in the range of an angle of view of the camera 61. Thus, the user US can perform image capturing more efficiently.

In addition, in the above-described embodiments, a position of the image display section 20 is specified by the GPS module 134, but a method of specifying position information including a position, a direction, and the like of the image display section 20 may have various modifications. For example, when the GPS module 134 is built in the image display section 20, position information of the image display section 20 is specified in more detail based on the built-in GPS module 134 and the nine-axis sensor 66. In the head mounted display 100, detailed position information of the optical image display units 26 and 28 covering the eyes of the user US can be specified. Therefore, a direction and the like of the user US in the horizontal direction and the vertical direction are specified, and thus a more detailed positional relationship between the image display section 20 and the object position specifying device 500 is specified. For this reason, the user US can be informed of a detailed positional relationship of the object OR, and thus convenience to the user further improves.

In addition, in the above-described embodiments, an image indicating a position of the object OB is displayed in the maximal image display region PN on the basis of the position of the object OB, but another control may be performed in addition to the control for displaying the image indicating the position of the object OB. A method of causing the user US to visually recognize the object OB may have various modifications. For example, automatic focus control may be performed based on a distance between the user US and the object OB. Specifically, in a case where a distance between the user US and the object OB is equal to or larger than a threshold value although the object OB is included in an angle of view of the camera 61, the control section 10 may record the object OB at a prescribed size or a larger size by using automatic focus. In the head mounted display 100 of Modification Example 3, it is possible to more clearly capture an image of the object OB even in a case where it is hard for the user US to visually recognize the object OB. Further, in a case where a position of the object OB whose image is captured is located in a peripheral part of an angle of view of the camera 61 although the object OB is included in the angle of view of the camera 61, image capturing may be performed so that the object OB is disposed at the center through automatic focus.

C4. Modification Example 4

In the above-described embodiments, the control section 10 acquires position information of the object position specifying device 500 via the wireless communication unit 132, and specifies a position of the image display section 20 by using the GPS module 134, but a method of specifying a relative position of the object OB for the user US is not limited thereto and may have various modifications. For example, in an event in a predetermined range performed indoors, position information for specifying positions of users US of a plurality of head mounted displays 100 may be temporarily stored in a server, and the position information of each user US may be transmitted to the individual user US from the server.

In addition, in the above-described embodiments, a visual line direction of the user US is estimated by the nine-axis sensor 66 disposed in the image display section 20, but a method of estimating a visual line direction is not limited thereto and may have various modifications. For example, a mere direction of the image display section 20 may be a visual line direction. A visual line direction of the user may be estimated by capturing an image of the eyes of the user with CCD cameras and analyzing the captured image.

In the above-described embodiments, the operation unit 135 is provided in the control section 10, but an aspect of the operation unit 135 may have various modifications. For example, there may be an aspect in which a user interface may be provided as the operation unit 135 independently of the control section 10. In this case, the operation unit 135 is independent of the control section 10 provided with the power supply 130 and the like, and thus can be miniaturized. Therefore, operability of the user US improves. In addition, a nine-axis sensor detecting a motion of the operation unit 135 is provided in the operation unit 135, and various operations are performed based on the detected motion. Accordingly, the user US can instinctively operate the head mounted display 100.

C5. Modification Example 5

In the above-described embodiments, the camera 61 is fixedly disposed in the image display section 20, but an arrangement and an aspect of the camera 61 are not limited thereto and may have various modifications. For example, there may be an aspect in which the camera 61 is provided in the image display section 20 but can change its direction with respect to the image display section 20. In the head mounted display 100 of Modification Example 5, in a case where the object OB is not included in the range of an angle of view of the camera 61, it is possible to inform the user US that the object OB is not included in the range of an angle of view of the camera 61 while automatically tracking and recording the object OB. In addition, the camera 61 may be disposed in the control section 10, and may be disposed in, for example, an upper part or the like of a helmet worn by the user US independently of the control section 10 or the image display section 20.

In the above-described embodiments, the range of an angle of view of the camera 61 is set to be substantially the same as the maximal image display region PN, but a relationship between the range of an angle of view of the camera 61 and the range of the maximal image display region PN is not limited thereto and may have various modifications. For example, the camera 61 may have a zoom function, and a variation in a relationship between a range of an angle of view after zoom and a range of the maximal image display region PN may be set to be calculated. In this case, the control section 10 can calculate a relationship between a position of the object OB for the maximal image display region PN and a position of the object OB for a captured image obtained by the camera 61 even if the range of an angle of view of the camera 61 varies. For this reason, even if there is a difference between the range of an angle of view of the camera 61 and the maximal image display region PN, an image indicating a position of the object OB is displayed in the maximal image display region PN.

C6. Modification Example 6

In the above-described embodiments, zooming control on an image capturing range is performed based on a specified visual line direction of the user US, but the zooming control on an image capturing range may not be performed based on a visual line direction of the user US. For example, the zooming control on an image capturing range may be performed on the basis of a specified position of the object OB. In Modification Example 6, the control section 10b enlarges or reduces an image capturing range centering on a position of the object OB. For this reason, in the head mounted display of Modification Example 6, even if the object OB which is an image capturing target does not match a visual line direction of the user US, it is possible to capture an image of the object OB.

In the above-described embodiments, blurring in a captured image is corrected by the image correction unit 148, but a correction target in a captured image is not limited to blurring and may have various modifications. For example, the image correction unit 148 may correct a tilt relative to the gravity direction obtained by the nine-axis sensor 66. In Modification Example 6, the nine-axis sensor 66 can detect tilts of the image display section 20 relative to the gravity direction and the horizontal direction. In a case where a straight line connecting the right eye and the left eye of the user US is different from the horizontal direction, that is, the head of the user US is tilted relative to the horizontal direction, the image correction unit 148 may correct a transverse axis of a captured image to match the horizontal direction. In the head mounted display of Modification Example 6, the nine-axis sensor 66 detects a motion of the head of the user US wearing the image display section 20, so as to detect a tilt of the image display section 20 relative to the gravity direction. Thus, it is possible to provide a clear captured image by correcting blurring in the image caused by unintended shaking of the head of the user US. In addition, in Modification Example 6, an azimuth of the image display section 20 is detected by the nine-axis sensor 66, but the azimuth may not be detected. Further, in relation to a tilt to be corrected, not only a tilt for matching the horizontal direction is corrected, and any tilt which is desired to be corrected may be set by the user US. Furthermore, the nine-axis sensor 66 corresponds to a motion detection unit.

C7. Modification Example 7

In the above-described embodiments, the operation unit 135 receives an operation, and thus the head mounted display 100 is controlled, but a method of controlling the head mounted display 100 is not limited thereto and may have various modifications. For example, in Modification Example 7, the microphone 63 may acquire sounds of the user US, the sound processing unit 170 may process the acquired sounds of the user US, and the control section 10 may control the head mounted display 100 on the basis of the process result. In the head mounted display 100 of Modification Example 7, the head mounted display 100 is controlled based on sounds of the user US, and thus the user US can control the head mounted display 100 without using the hands. Therefore, convenience to the user US improves.

In addition, the head mounted display 100 may be controlled using open and closed states of the eyelids or a visual line direction of the user US. In Modification Example 7, the image judgment unit 142 specifies open and closed states of the eyes along with a visual line direction of the user US on the basis of right eye and left eye images of the user US captured by the eye image capturing cameras 37 and 38, and the control section 10 controls the head mounted display 100 on the basis of the specified visual line direction and open and closed states of the eyes. For example, in a case where a winking state in which the right eye is closed and the left eye is open transitions to a winking state in which the left eye is closed and the right eye is open, starting and finishing of recording of the camera 61 may be changed. In addition, in a case where a predetermined number of blinks is performed during a predetermined time period, zooming control may be performed. A variety of operations may be assigned to not only blinks of both eyes but also blinks of one eye. Further, the predetermined time or the predetermined number of blinks may be arbitrarily set so that an unintended blink of the user US is not detected by mistake. Furthermore, in relation to the open and closed states of the eyes, an operation or control may be different based on an extent of being open and closed. In the head mounted display 100 of Modification Example 7, the eye image capturing cameras 37 and 38 image the eyes of the user US, and the control section 10 controls the head mounted display 100 on the basis of an eye state of the user US which is judged by the image judgment unit 142. For this reason, in Modification Example 7, the user US can control the head mounted display 100 without using his/her hands, and the sounds of the user US are not acquired in combination with external sounds other than the sounds of the user US. Therefore, it is possible to acquire appropriate captured image and sounds as requested by the user US.

C8. Modification Example 8

Figure 21A:
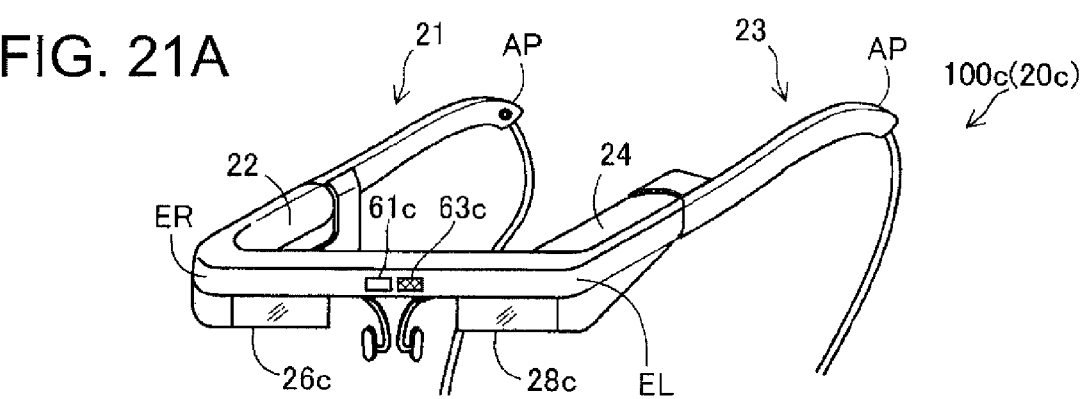
FIGS. 21A and 21B are diagrams illustrating exterior configurations of head mounted displays in a modification example.
Figure 21B:
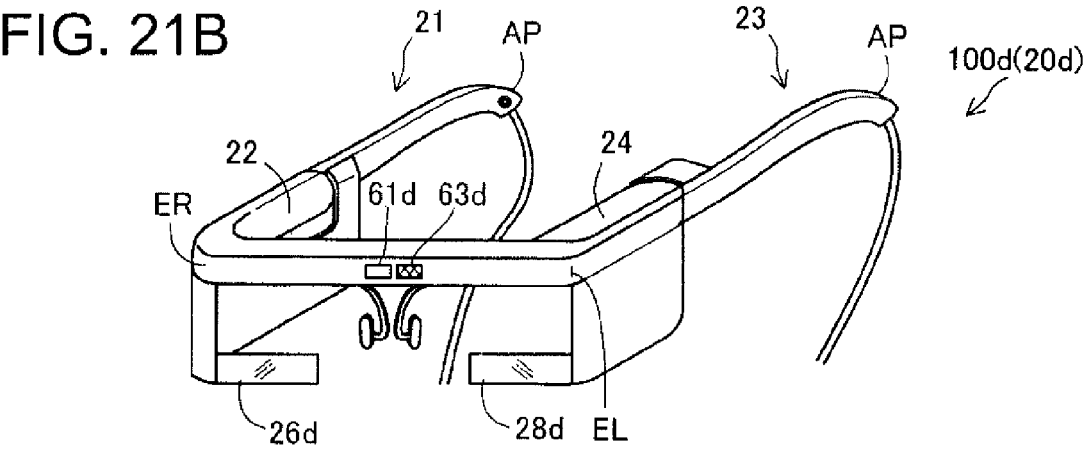

FIGS. 21A and 21B are diagrams illustrating exterior configurations of head mounted displays in a modification example. In a case of an example of FIG. 21A, a difference from the head mounted display 100 illustrated in FIG. 2 is that an image display section 20c includes a right optical image display unit 26c instead of the right optical image display unit 26 and a left optical image display unit 28c instead of the left optical image display unit 28. The right optical image display unit 26c is formed to be smaller than the optical member of the above-described embodiments, and is disposed on the obliquely upper side of the right eye of the user US when a head mounted display 100c is mounted. Similarly, the left optical image display unit 28c is formed smaller than the optical member of the above-described embodiments, and is disposed on the obliquely upper side of the left eye of the user US when the head mounted display 100c is mounted. In a case of an example of FIG. 21B, a difference from the head mounted display 100 illustrated in FIG. 1 is that an image display section 20d includes a right optical image display unit 26d instead of the right optical image display unit 26 and a left optical image display unit 28d instead of the left optical image display unit 28. The right optical image display unit 26d is formed smaller than the optical member of the above-described embodiments, and is disposed on the obliquely lower side of the right eye of the user US when a head mounted display is mounted. Similarly, the left optical image display unit 28d is formed smaller than the optical member of the above-described embodiments, and is disposed on the obliquely lower side of the left eye of the user US when the head mounted display is mounted. As above, the optical display units have only to be disposed near the eyes of the user US. Any size of the optical member forming the optical image display units may be used, and the head mounted display 100 may be implemented in an aspect in which the optical image display units cover only a part of the eyes of the user US, in other words, the optical image display units do not completely cover the eyes of the user US.

C9. Modification Example 9

For example, the image light generation portion may include an organic electroluminescent (EL) display and an organic EL controller. In addition, for example, LCOS (liquid crystal on silicon; LCoS is a registered trademark) or a digital micromirror device may be used as the image light generation portion instead of an LCD. Further, for example, the invention is applicable to a laser retinal projective head mounted display. In a case of the laser retinal projective head mounted display, a "region which can emit image light in the image light generation portion" may be defined as an image region recognized by the eyes of the user US.

In addition, for example, the head mounted display may be a head mounted display in an aspect in which the optical image display units cover only a part of the eyes of the user US, in other words, the optical image display units do not completely cover the eyes of the user US. Further, the head mounted display may be a so-called monocular head mounted display. Furthermore, the image formation region in the appended claims can also be paraphrased as a range in which the user US visually recognizes a virtual image.

In addition, the earphone may employ an ear-mounted type or a headband type, or may be omitted. Further, for example, the head mounted display may be configured to be mounted in a vehicle such as an automobile or an airplane. Furthermore, for example, the head mounted display may be configured to be built in a body protection tool such as a helmet.

C10. Modification Example 10

A configuration of the head mounted display 100 in the above-described embodiment is only an example and may have various modifications. For example, either of the direction key 16 and the track pad 14 provided in the control section 10 may be omitted, and other operation interfaces such as an operation stick may be provided along with the direction key 16 or the track pad 14 or instead of the direction key 16 or the track pad 14. In addition, the control section 10 may be configured to be connected to an input device such as a keyboard or a mouse and may receive an input from the keyboard or the mouse.

Further, as an image display section, instead of the image display section 20 which is worn as glasses, other types of image display sections such as an image display section which is worn as, for example, a cap, may be employed. Furthermore, the earphones 32 and 34 and the camera 61 may be omitted as appropriate. Moreover, in the above-described embodiments, the LCD and the light source are used as a configuration of generating image light, but, alternatively, other display elements such as an organic EL display may be employed. In addition, in the above-described embodiments, the nine-axis sensor 66 is used as a sensor detecting a motion of the head of the user US, but, alternatively, a sensor constituted by one or two of an acceleration sensor, an angular velocity sensor, and a geomagnetism sensor may be used. Further, in the above-described embodiments, the head mounted display 100 is of a binocular optical transmission type, but the invention is also applicable to head mounted displays of other types such as, for example, a video transmission type or a monocular type.

In addition, in the above-described embodiments, the head mounted display 100 may guide image light representing the same image to the left and right eyes of the user US so that the user US visually recognizes two-dimensional images, and may guide image light representing different images to the left and right eyes of the user US so that the user US visually recognizes three-dimensional images.

Further, in the above-described embodiments, some of the constituent elements realized in hardware may be realized in software, and, conversely, some of the configurations realized in software may be realized in hardware. For example, in the above-described embodiments, the image processing unit 160 or the sound processing unit 170 is realized by the CPU

140 reading and executing a computer program, but these function units may be realized by a hardware circuit.

In addition, when some or all of the functions of the invention are realized in software, the software (computer program) may be provided in a form in which the software is stored in a computer readable recording medium. In the invention, the "computer readable recording medium" is not limited to a portable recording medium such as a flexible disc or a CD-ROM, and also includes internal storage devices of a computer such as a variety of RAMs or ROMs, and an external storage device fixed to a computer, such as a hard disk.

In the above-described embodiments, as illustrated in FIGS. 2 and 3, the control section 10 is provided separately from the image display section 20, but a configuration of the control section 10 and the image display section 20 is not limited thereto and may have various modifications. For example, all of the constituent elements of the control section 10 may be provided in the image display section 20, and some of them may be provided therein. In addition, the power supply 130 in the above-described embodiments may be provided independently and may be exchangeable, and the constituent elements provided in the control section 10 may be provided in the image display section 20 in an overlapping manner. For example, the CPU 140 illustrated in FIG. 2 may be provided in both of the control section 10 and the image display section 20, and functions of the CPU 140 provided in the control section 10 and a CPU provided in the image display section 20 may be divided so as to be independent.

In addition, there may be an aspect in which the control section 10 is built in a personal computer (PC), the image display section 20 is used as a monitor of the PC, and there may be an aspect of a wearable computer in which the control section 10 and the image display section 20 are integrally formed and are installed in clothes of the user US.

The invention is not limited to the above-described embodiments or modification examples, and may be implemented using various configurations without departing from the gist thereof. For example, the embodiments corresponding to technical features of the respective aspects described in Summary of Invention and the technical features in the modification examples may be exchanged or combined as appropriate in order to solve some or all of the above-described problems, or in order to achieve some or all of the above-described effects. In addition, if the technical feature is not described as an essential feature in the present specification, the technical feature may be deleted as appropriate.

The entire disclosure of Japanese Patent Application Nos. 2013-024089, filed Feb. 12, 2013 and 2013-225388, filed Oct. 30, 2013 are expressly incorporated by reference herein.

What is claimed is:

1. A transmission type head mounted display comprising:
an image display that forms an image based on image data and allows the formed image to be visually recognized by a user as a virtual image in a state in which the image display is mounted on a head of the user;
an image capturer having a predetermined range of an angle of view overlapping a visual line direction of the user, the image capturer capturing an image of external scenery within the predetermined range; and
a processor configured to:
specify a target position which is a position of a specific target object relative to the image display;
cause the image display to form an image indicating the predetermined range whose image is captured by the image capturer;
judge whether or not the specific target is included in the predetermined range, and when the processor judges that the specific target object is included in the predetermined range;
cause the image display to form a target position display image indicating the target position;
set a position of the target position display image in an image formation region which is a region where the image display forms an image, based on the target position; and
when the processor judges that the specific target object is not included in the predetermined range;
cause the image display to form the target position display image as a target direction estimation image which is an image indicating a direction from the image display to the specific target object; and
set a position of the target direction estimation image in the image formation region based on the target position.

2. The head mounted display according to claim 1, wherein the target direction estimation image includes an image indicating the target position.

3. The head mounted display according to claim 1, wherein the processor is further configured to:
cause the image display to form a captured image obtained by the image capturer as an image of a region smaller than the image formation region.

4. The head mounted display according to claim 3, wherein the processor is further configured to:
set a position of the captured image in the image formation region based on an angle formed between the visual line direction and a direction from the image display to the specific target object.

5. The head mounted display according to claim 3, wherein the processor is further configured to:
set a position of the captured image in the image formation region, in parts excluding a center of the image formation region.

6. The head mounted display according to claim 1, wherein the processor is further configured to:
specify a distance between the image display and the specific target object based on the target position; and
cause the image display to form an image indicating the specified distance.

7. The head mounted display according to claim 1, wherein the processor is further configured to:
when the processor judges that the specific target object is included in the predetermined range, cause the image display to form an image in which the predetermined range set based on the target position is enlarged or reduced.

8. The head mounted display according to claim 1, wherein the processor is further configured to:
specify the visual line direction of the user; and
cause the image display to form an image in which the predetermined range which is set based on the specified visual line direction and whose image is captured by the image capturer is enlarged or reduced.

9. The head mounted display according to claim 1, further comprising:
a sound acquirer that acquires sounds,
wherein the processor controls the image capturer based on acquired sounds.

10. The head mounted display according to claim 1, further comprising:
an eye image capturer that captures an image of the eyes of the user,
wherein the processor controls the image capturer based on a captured image of an eye state of the user.

11. The head mounted display according to claim 1, wherein the processor is further configured to:
correct image blurring in an image captured by the image capturer.

12. The head mounted display according to claim 1, further comprising:
a motion detector that detects a motion of the image display and a display tilt which is a tilt of the image display relative to a gravity direction,
wherein the processor corrects a tilt of an image captured by the image capturer, relative to the gravity direction, based on the detected motion of the image display and display tilt.

13. A control method for a transmission type head mounted display which includes an image display that forms an image based on image data and allows the formed image to be visually recognized by a user as a virtual image in a state in which the image display is mounted on a head of the user, the control method comprising:
specifying a target position which is a position of a specific target object relative to the image display;
capturing an image of external scenery within a predetermined range of an angle of view of an image capturer overlapping a visual line direction of the user;
causing the image display to form a image indicating the predetermined range whose image is captured by the image capturer;
judging whether or not the specific target is included in the predetermined range, and when it is judged that the specific target object is included in the predetermined range;
causing the image display to form a target position display image indicating the target position and setting a position of the target position display image in an image formation region which is a region where the image display forms an image, based on the specified target position; and
when it is judged that the specific target object is not included in the predetermined range;
causing the image display to form the target position display image as a target direction estimation image which is an image indicating a direction from the image display to the specific target object; and
setting a position of the target direction estimation image in the image formation region based on the target position.

14. An image display system comprising:
a target position information transmission device that transmits position information indicating a target position which is a position of a specific target object; and
a transmission type head mounted display, including:
an image display that forms an image based on image data and allows the formed image to be visually recognized by a user as a virtual image in a state in which the image display is mounted on a head of the user;
an image capturer having a predetermined range of an angle of view overlapping a visual line direction of the user, the image capturer capturing an image of external scenery within the predetermined range; and
a processor configured to:
specify the target position by receiving the position information transmitted by the target position information transmission device;
cause the image display to form an image indicating the predetermined range whose image is captured by the image capturer;
judge whether or not the specific target is included in the predetermined range, and when the processor judges that the specific target object is included in the predetermined range;
cause the image display to form a target position display image indicating the target position;
set a position of the target position display image in an image formation region which is a region where the image display forms an image, based on the target position; and
when the processor judges that the specific target object is not included in the predetermined range;
cause the image display to form the target position display image as a target direction estimation image which is an image indicating a direction from the image display to the specific target object; and
set a position of the target direction estimation image in the image formation region based on the target position.

* * * * *